US012756784B2

(12) United States Patent

Nozaki et al.

(10) Patent No.: US 12,756,784 B2

(45) Date of Patent: Oct. 6, 2026

(54) MEDIUM PROCESSING DEVICE AND IMAGE FORMING APPARATUS

(71) Applicants: Wataru Nozaki, Kanagawa (JP); Yuusuke Shibasaki, Tokyo (JP); Atsushi Shinoda, Kanagawa (JP); Yusuke Hirono, Kanagawa (JP); Shuuto Tohkaishi, Kanagawa (JP); Satoshi Hirata, Kanagawa (JP); Shingo Yoshizawa, Kanagawa (JP); Naofumi Yoshida, Kanagawa (JP); Suzuka Fujita, Kanagawa (JP); Ryota Takayama, Kanagawa (JP); Takahiro Watanabe, Kanagawa (JP); Jun Yamada, Kanagawa (JP); Takuya Morinaga, Tokyo (JP); Yuji Suzuki, Kanagawa (JP); Kanako Fujisaki, Kanagawa (JP)

(72) Inventors: Wataru Nozaki, Kanagawa (JP); Yuusuke Shibasaki, Tokyo (JP); Atsushi Shinoda, Kanagawa (JP); Yusuke Hirono, Kanagawa (JP); Shuuto Tohkaishi, Kanagawa (JP); Satoshi Hirata, Kanagawa (JP); Shingo Yoshizawa, Kanagawa (JP); Naofumi Yoshida, Kanagawa (JP); Suzuka Fujita, Kanagawa (JP); Ryota Takayama, Kanagawa (JP); Takahiro Watanabe, Kanagawa (JP); Jun Yamada, Kanagawa (JP); Takuya Morinaga, Tokyo (JP); Yuji Suzuki, Kanagawa (JP); Kanako Fujisaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 228 days.

(21) Appl. No.: 18/739,766

(22) Filed: Jun. 11, 2024

(65) Prior Publication Data

US 2024/0422273 A1 Dec. 19, 2024

(30) Foreign Application Priority Data

Jun. 19, 2023 (JP) ................................ 2023-100163

(51) Int. Cl.
*H04N 1/00* (2006.01)

(52) U.S. Cl.
CPC ..... *H04N 1/00639* (2013.01); *H04N 1/00615* (2013.01); *H04N 1/00689* (2013.01)

(58) Field of Classification Search
USPC ....... 358/1.1–3.29, 1.11–1.18, 498, 304–305
See application file for complete search history.

(56) References Cited

U.S. PATENT DOCUMENTS 10,987,964 B2 * 4/2021 Noguchi .................. B42C 1/12
11,518,642 B2 * 12/2022 Shimizu ................ B65H 37/04
(Continued)

FOREIGN PATENT DOCUMENTS

JP 2015-009966 A 1/2015
JP 2015-020823 A 2/2015
(Continued)

*Primary Examiner* — Marcellus J Augustin
(74) *Attorney, Agent, or Firm* — IPUSA, PLLC

(57) ABSTRACT

A medium processing device includes a conveyor to convey multiple sheets in a conveyance direction; a tray to stack the multiple sheets; a first binder to perform a first binding process; a second binder to perform a second binding process; a common guide extending in a main scanning direction; a first branch guide branched from one end of the common guide in the main scanning direction to a first standby position; and a second branch guide branched from the one end of the common guide in the main scanning direction to a second standby position. The first binder is movable between the first standby position and the manual
(Continued)

binding position along the first branch guide and the common guide. The second binder is movable between the second standby position and the manual binding position along the second branch guide and the common guide.

11 Claims, 19 Drawing Sheets

(56) References Cited

U.S. PATENT DOCUMENTS

2015/0037120 A1* 2/2015 Kubo ........................ B42B 4/00 412/33
2015/0360899 A1 12/2015 Takahashi et al.
2016/0096391 A1* 4/2016 Shimura ............ G03G 15/6544 270/58.11
2016/0221787 A1 8/2016 Matsushita et al.
2016/0340144 A1 11/2016 Sakano et al.
2016/0340145 A1 11/2016 Kunieda et al.
2016/0360053 A1 12/2016 Suzuki et al.
2017/0076188 A1* 3/2017 Kanematsu .......... H04N 1/0032
2017/0305706 A1 10/2017 Takahashi et al.
2019/0291497 A1* 9/2019 Matsumoto ............. G06F 3/121
2020/0140222 A1 5/2020 Takahashi et al.
2021/0354947 A1* 11/2021 Tanoue .................. B65H 37/04
2023/0099220 A1* 3/2023 Obuchi .............. G03G 15/6544 270/58.08
2024/0017956 A1* 1/2024 Sakakibara ........ B65H 31/3027

FOREIGN PATENT DOCUMENTS

JP 2016-011189 A 1/2016
JP 2016-108136 A 6/2016
JP 2017-081696 A 5/2017
JP 2021-024678 A 2/2021

* cited by examiner

MEDIUM PROCESSING DEVICE AND IMAGE FORMING APPARATUS

CROSS-REFERENCE TO RELATED APPLICATIONS

This patent application is based on and claims priority pursuant to 35 U.S.C. § 119 (a) to Japanese Patent Application No. 2023-100163, filed on Jun. 19, 2023, in the Japan Patent Office, the entire disclosure of which is hereby incorporated by reference herein.

BACKGROUND

Technical Field

The present disclosure relates to a medium processing device and an image forming apparatus.

Related Art

There has been known a medium processing device that performs a process of bundling and binding sheet-shaped media on which an image is formed by an image forming apparatus. In addition, some medium processing devices can execute "online stapling" of binding a medium bundle conveyed by a conveyor and "manual stapling" of binding a medium bundle inserted through a slit.

SUMMARY

An embodiment of the present disclosure provides a medium processing device including: a conveyor to convey multiple sheets in a conveyance direction; a tray to stack the multiple sheets conveyed to the tray by the conveyor; a first binder to perform a first binding process on the multiple sheets stacked on the tray; a second binder to perform a second binding process different from the first binding process on the multiple sheets stacked on the tray; a common guide extending in a main scanning direction intersecting the conveyance direction and disposed upstream from the tray in the conveyance direction; a first branch guide branched from one end of the common guide in the main scanning direction to a first standby position in a first direction inclined with the main scanning direction; and a second branch guide branched from the one end of the common guide in the main scanning direction to a second standby position in a second direction different from the first direction and inclined with the main scanning direction. The first binder is movable between the first standby position and a manual binding position along the first branch guide and the common guide. The second binder is movable between the second standby position and the manual binding position along the second branch guide and the common guide.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
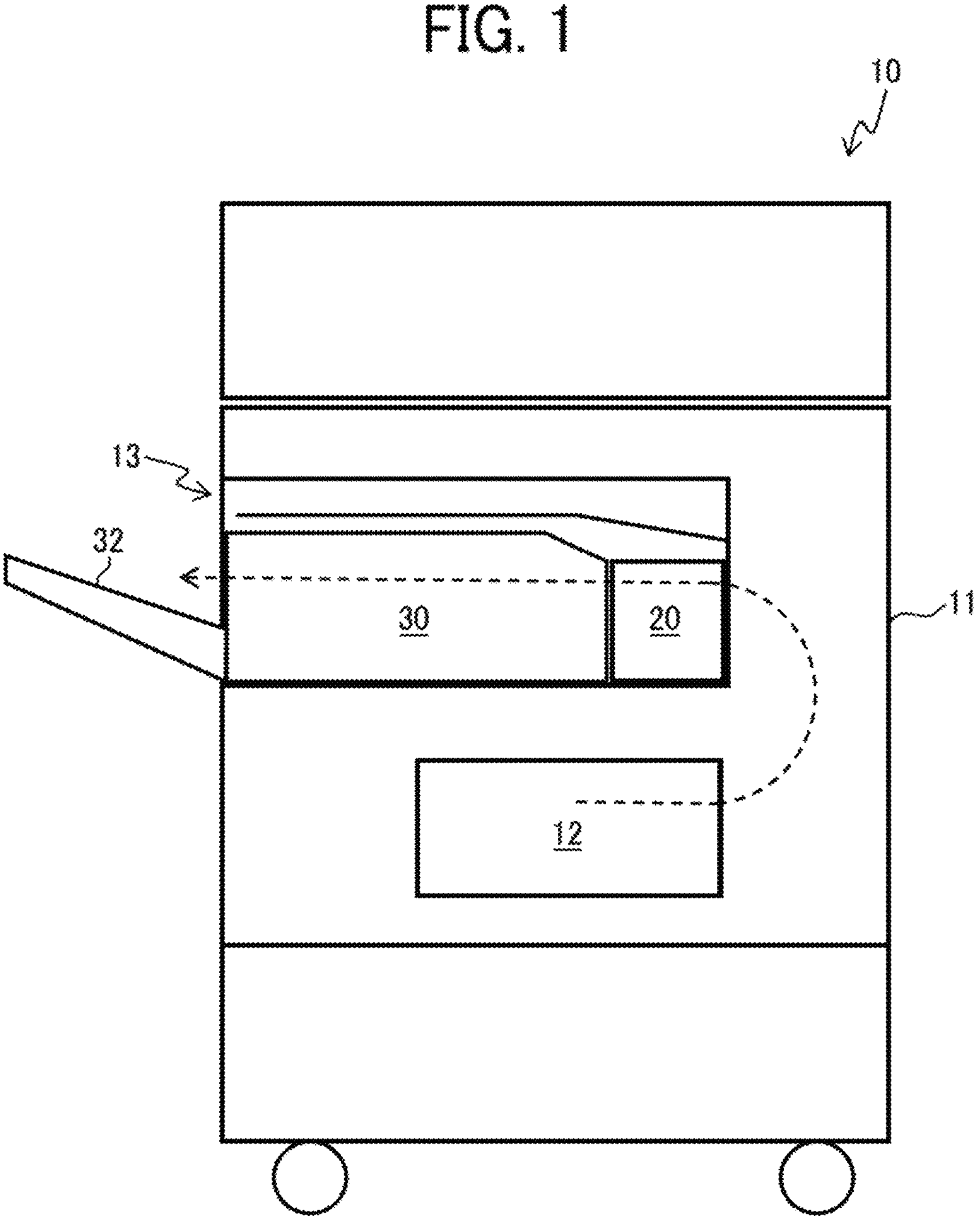
FIG. 1 is a schematic diagram of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTIONS OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

For example, Patent Literature 1 discloses a medium processing device that interrupts manual stapling in a case where the manual stapling is instructed during online stapling and in a case where the manual stapling can be executed during a stacking waiting time of a medium bundle in the online stapling.

In recent years, a medium processing device including not only a stapler that inserts a binding needle into a medium bundle and binds the medium bundle, but also a crimping binder that pressure-deforms and binds the medium bundle is increasing. However, when two binder are provided in the medium processing device of Patent Literature 1, there is still a problem that manual stapling can be executed only by the binder on the side close to the slit.

According to the present disclosure, a medium processing device can be obtained that performs a manual binding process by any of multiple binder having different binding methods.

Hereinafter, an image forming apparatus 10 according to the present disclosure will be described with reference to the drawings. FIG. 1 is a schematic diagram of the image forming apparatus 10 according to the present embodiment. The image forming apparatus 10 is an apparatus that forms an image on a sheet S (typically, a sheet of paper), which is an example of a sheet-shaped medium. As illustrated in FIG. 1, the image forming apparatus 10 includes a housing 11 and an image former 12.

The housing 11 has a box shape to form an internal space for accommodating components of the image forming apparatus 10. The housing 11 has an in-body space 13 that is accessible from the outside of the image forming apparatus 10. The in-body space 13 is located, for example, slightly above the center of the housing 11 in the vertical direction. The in-body space 13 is exposed to the outside by cutting out the outer wall of the housing 11. Further, the puncher 20 and the binding unit 30 (medium processing device) can be attached to the in-body space 13.

The image former 12 forms an image on the sheet S accommodated in the tray, and ejects the sheet S on which the image is formed to the puncher 20, the binding unit 30, or the liquid application unit. The image former 12 may be an inkjet image forming device that forms an image with ink or an electrophotographic image forming device that forms an image with toner. Since the configuration of the image former 12 is already known, a detailed description thereof will be omitted.

The puncher 20 is attached to the in-body space 13 of the image forming apparatus 10 on the downstream side of the image former 12 and on the upstream side of the binding unit 30 in the conveyance path of the sheet S from the image former 12 to the binding unit 30 (the path indicated by the dashed arrow in FIG. 1). That is, the sheet S on which an image is formed by the image former 12 is first delivered to the puncher 20 and subjected to a punch hole drilling process to be described later, and then delivered to the binding unit 30 and subjected to a binding process described later.

Further, the puncher 20 can be attached to and detached from the image forming apparatus 10.

When the puncher 20 is removed, the sheet S on which an image is formed by the image former 12 is directly delivered to the binding unit 30 and subjected to the binding process. Further, another process unit such as a liquid application unit can be attached to and detached from a position where the puncher 20 is detached in the in-body space 13. That is, the image forming apparatus 10 allows the puncher 20 and the liquid application unit to be interchanged according to the application.

When the liquid application unit is attached, the sheet S on which the image is formed by the image former 12 is first delivered to the liquid application unit and subjected to the liquid application process, and then delivered to the binding unit 30 and subjected to the binding process. The liquid application process is the process of applying liquid to a binding position on the surface of the sheet S, the binding position being to be bound by the binding unit 30. At the position where the puncher 20 is removed from the in-body space 13, a unit that performs an arbitrary process on the sheet S can be attached without being limited to the liquid application unit.

Figure 2A:
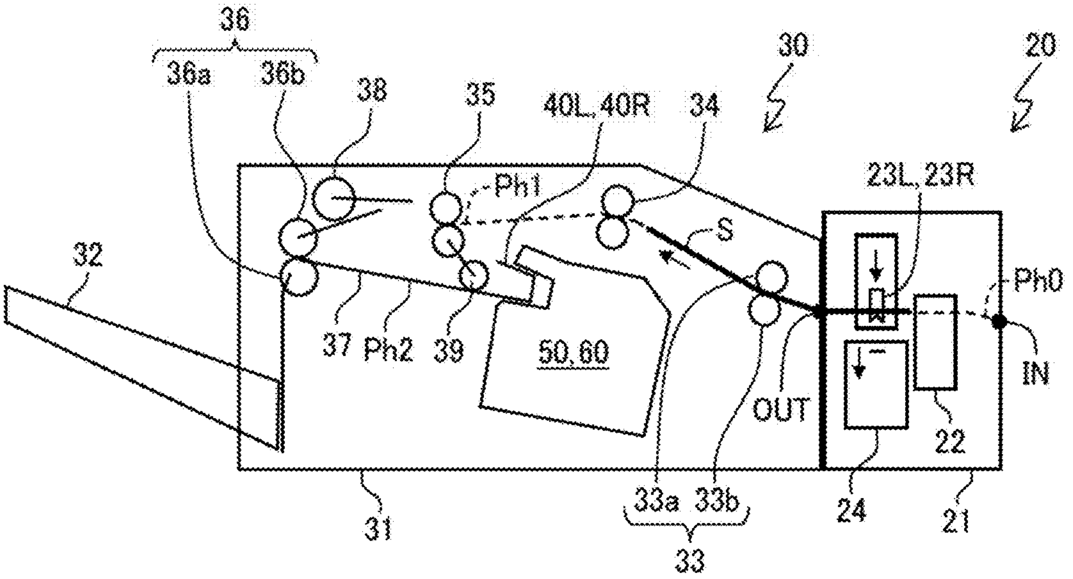
FIGS. 2A and 2B are views illustrating an internal configuration of a puncher and a binding unit.
Figure 2B:
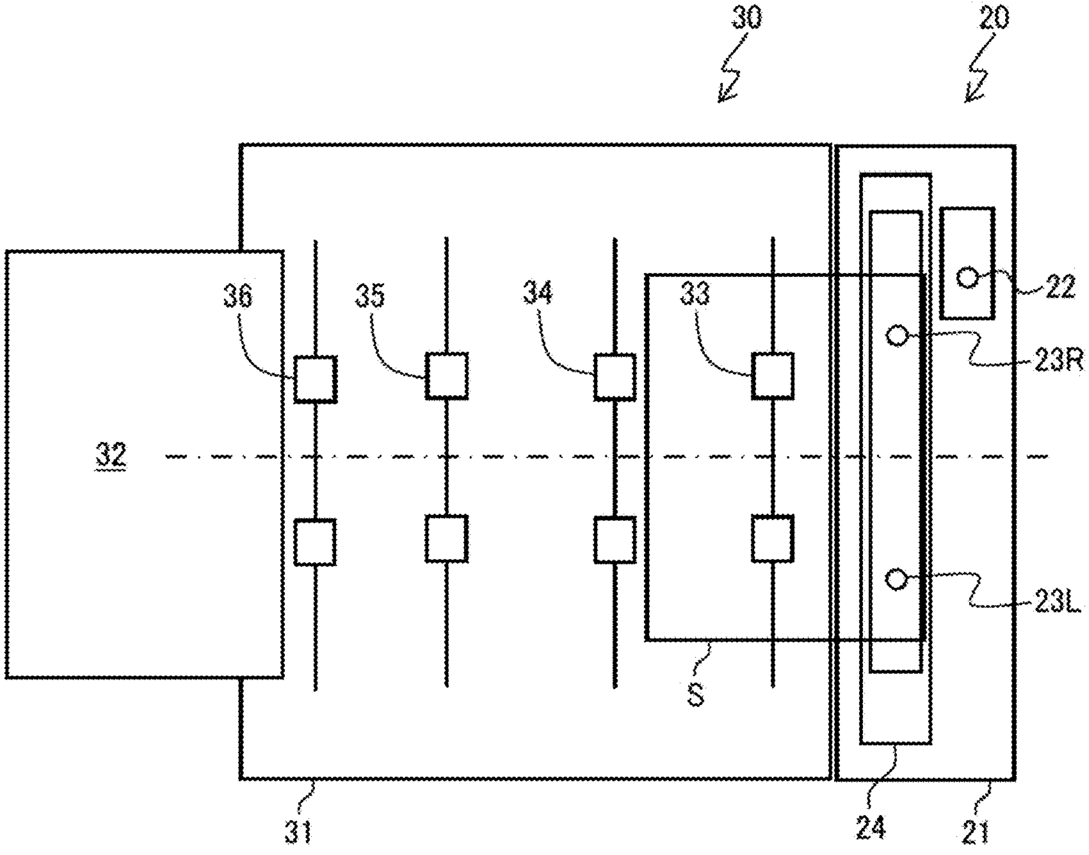

FIGS. 2A and 2B are views illustrating an internal configuration of the puncher 20 and the binding unit 30.

Each of the puncher 20 and the binding unit 30 is unitized, and an input/output interface of the sheet S can be coupled thereto. That is, an input interface IN of the puncher 20 is coupled to an output interface of the image former 12. Further, an input interface of the binding unit 30 is coupled to the output interface of the image former 12 and an output interface OUT of the puncher 20.

As illustrated in FIGS. 2A and 2B, the puncher 20 includes a housing 21, a sheet sensor 22, punch pins 23L and 23R, and a punch chad container 24. The housing 21 includes an internal space that accommodates components of the puncher 20. In the internal space of the housing 21, a conveying path Ph0 through which a sheet on which an image is formed by the image former 12 passes is formed. The sheet sensor 22 detects that the sheet S supplied from the image former 12 has reached a predetermined position. The punch pins 23L and 23R punch the sheet S detected by the sheet sensor 22. The punch chads that have fallen off from the sheet S fall into the punch chad container 24. The above-described puncher 50 performs the punching process for punching the sheet S.

Figure 3:
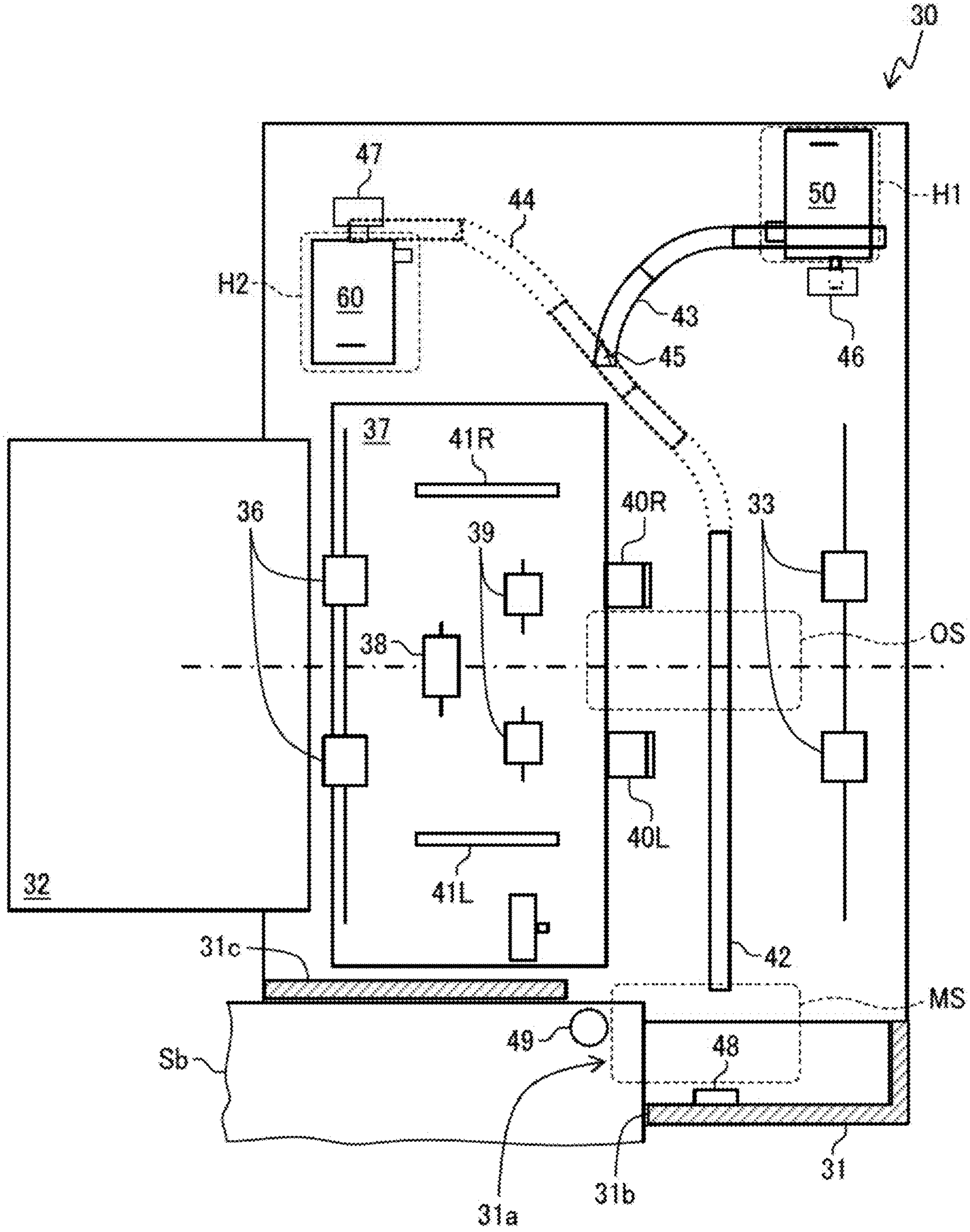
FIG. 3 is a view of a binding unit as viewed from a thickness direction.

FIG. 3 is a view of the binding unit 30 as viewed from the thickness direction. The binding unit 30 is a medium processing device that performs binding process (post-process) of bundling and binding the sheet bundle Sb on which an image is formed by the image former 12. The binding process is a process in which a stapling and a crimp binding to be described later are combined with an automatic binding process and a manual binding process to be described later. Hereinafter, the automatic binding process by the stapler 50 is referred to as “automatic stapling”, the manual binding process by the stapler 50 is referred to as “manual stapling”, the automatic binding process by the crimping binder 60 is referred to as “automatic crimp binding”, and the manual binding process by the crimping binder 60 is referred to as “manual crimp binding”.

As illustrated in FIGS. 2A, 2B and 3, the binding unit 30 includes a binding case 31, an ejection tray 32, multiple conveyance roller pairs 33, 34, 35, and 36 (conveyor), an internal tray 37 (tray), a tapping roller 38 (conveyor), a return roller 39, end fences 40L and 40R, side fences 41L and 41R (main scanning direction alignment unit), a common rail 42 (common guide), a first branch rail 43 (first branch guide), a second branch rail 44 (second branch guide), a switching claw 45, an H1 position sensor 46 (first detector), an H2 position sensor 47 (second detector), an MS position sensor 48 (manual binding position detector), a sheet sensor 49 (medium detector), a stapler 50, and a crimping binder 60.

The binding case 31 has a box shape in which an internal space for accommodating components (32 to 50, and 60) of the binding unit 30 is formed. Further, the internal space of the binding case 31 includes conveying paths Ph1 and Ph2, which are spaces through which the sheet S passes. The ejection tray 32 is supported on an outer surface of the binding case 31. The ejection tray 32 stacks the sheet S or the sheet bundle Sb conveyed by the conveyance roller pairs 33 to 36.

The binding case 31 includes a binding slit 31*a* for manual binding on a side surface of the binding case 31. The corner of the sheet bundle Sb inserted into the binding case 31 through the binding slit 31*a* can be manually bound by the stapler 50 or the crimping binder 60 moved to the binding slit 31*a* side. The binding case 31 further includes guide walls 31*b* and 31*c* in a manner that the guide walls 31*b* and

31*c* surround the binding slit 31*a*. The guide walls 31*b* and 31*c* position the sheet bundle Sb to be manually bound (that is, the corner portion is inserted into the binding slit 31*a*).

The conveyance roller pairs 33 to 36 are disposed on the conveying path Ph1 at a predetermined interval. The conveyance roller pairs 33 to 36 convey the sheet S in the first conveyance direction along the conveying path Ph1. The conveying path Ph1 is a path from an input interface of the binding unit 30 to the ejection tray 32 via the internal tray 37. The first conveyance direction is a direction from the input interface of the binding unit 30 to the ejection tray 32 via the internal tray 37.

The conveyance roller pair 33 includes a driving roller 33*a* and a driven roller 33*b* arranged to face each other across the conveying path Ph1. The driving roller 33*a* and the driven roller 33*b* are rotatably supported by the binding case 31. The rotation driving force of the conveyance motor is transmitted to the driving roller 33*a*, and the driving roller 33*a* rotates forward in the first conveyance direction (clockwise in FIGS. 2A and 2B) in which the sheet S is conveyed. The driven roller 33*b* is arranged to face the driving roller 33*a* with the conveying path Ph1 sandwiched therebetween, and is driven with the rotation of the driving roller 33*a*. Then, when the conveyance motor is driven in a state where the driving roller 33*a* and the driven roller 33*b* sandwich the sheet S, the sheet S is conveyed in the first conveyance direction along the conveying path Ph1.

The basic configuration of the conveyance roller pairs 34 to 36 is common to the conveyance roller pair 33. The conveyance roller pair 36 is configured by a driving roller 36*a* and a driven roller 36*b* that can be brought into contact with and separated from the driving roller 36*a*. Further, the conveyance roller pair 35 may slide in the width direction in order to implement a sorting process of shifting the sheet S in the width direction and ejecting the sheet S to the ejection tray 32. The conveyance roller pair 36 is provided at an end portion of the internal tray 37 on an opposite side of the common rail 42 (an upstream end portion of the internal tray 37 in the second conveyance direction).

The internal tray 37 temporarily stacks multiple sheets S (hereinafter, referred to as a "sheet bundle Sb") conveyed by the conveyance roller pair 36. The tapping roller 38 is supported at a tip end of a rotation arm above the internal tray 37. When the rotation arm rotates, the tapping roller 38 abuts on the upper surface of the sheet S (in other words, the sheet S that has reached the internal tray 37) that has entered between the driving roller 36*a* and the driven roller 36*b* separated from each other. When the tapping roller 38 rotates in this state, the sheet S is conveyed in the second conveyance direction along the conveying path Ph2. The return roller 39 abuts on the upper surface of the sheet S stacked on the internal tray 37 and rotates to guide the sheet S toward the conveyance roller pair 36.

The conveying path Ph2 is a path that branches from the conveying path Ph1 at the position of the conveyance roller pair 36 and reaches the end fences 40L and 40R and the common rail 42 along the stacking surface (upper surface) of the internal tray 37. The second conveyance direction is a direction from the conveyance roller pair 36 to the end fences 40L and 40R and the common rail 42 along the stacking surface of the internal tray 37. That is, the second conveyance direction is a direction different from the first conveyance direction (typically, in the reverse direction). A direction orthogonal to the second conveyance direction and a direction orthogonal to the thickness direction of the sheet S stacked on the internal tray 37 are referred to as a "main scanning direction".

The conveyance roller pair 36 is disposed on the downstream side of the conveyance roller pair 35 in the first conveyance direction.

The internal tray 37 is disposed below the conveyance roller pair 35. Therefore, the sheet S conveyed by the conveyance roller pair 35 enters between the driving roller 36*a* and the driven roller 36*b* of the conveyance roller pair 36. Further, the sheet S whose rear end has passed through the conveyance roller pair 35 falls toward the internal tray 37 and is stacked on the internal tray 37. In addition, the tapping roller 38 can come into and out of contact with the sheet S stacked on the internal tray 37.

The end fences 40L and 40R are arranged at the end portion of the internal tray 37 on the downstream side in the second conveyance direction. The end fences 40L and 40R abut on the end portion of the sheet S stacked on the internal tray 37 on the downstream side in the second conveyance direction to align the position of the sheet S in the second conveyance direction. The side fences 41L and 41R are arranged at both end portions in the main scanning direction of the sheet S stacked on the internal tray 37. The side fences 41L and 41R abut on both end portions in the main scanning direction of the sheet S stacked on the internal tray 37 to align the positions in the main scanning direction. The side fences 41L and 41R move in the main scanning direction.

The common rail 42 extends in the main scanning direction on the downstream side of the internal tray 37 in the second conveyance direction. One end of the common rail 42 is coupled to the first branch rail 43 and the second branch rail 44 at a position deviated to one side in the main scanning direction from the sheet S stacked on the internal tray 37. The other end of the common rail 42 is close to the binding slit 31*a* at a position deviated to the other side in the main scanning direction from the sheet S stacked on the internal tray 37. The position of the common rail 42 that can face the sheets S stacked on the internal tray 37 is an automatic binding position (hereinafter, referred to as "OS position") at which the stapler 50 or the crimping binder 60 executes the automatic binding process. The other end of the common rail 42 is a manual binding position (hereinafter, referred to as "MS position") at which the stapler 50 or the crimping binder 60 executes the manual binding process.

The first branch rail 43 extends between one end of the common rail 42 and a first standby position (hereinafter, referred to as "H1 position"), which deviated to one end side in the main scanning direction from the sheet S stacked on the internal tray 37. The second branch rail 44 extends between one end of the common rail 42 and a second standby position (hereinafter, referred to as "H2 position"), which deviated to one end side in the main scanning direction from the sheet S stacked on the internal tray 37. That is, the first branch rail 43 and the second branch rail 44 branch from one end of the common rail 42 and extend to the H1 position and the H2 position, which are different from each other. The H1 position is a position where the stapler 50 that does not execute the automatic binding process and the manual binding process stands by. The H2 position is a position where the crimping binder 60 that does not execute the automatic binding process and the manual binding process stands by.

The common rail 42, the first branch rail 43, and the second branch rail 44 are guide members that guide the movement of the stapler 50 and the crimping binder 60. A specific example of the guide member is not limited to a form of a rail, and may be a form of a shaft, a groove, a wall, or the like.

The switching claw 45 guides the stapler 50 or the crimping binder 60 that moves along the common rail 42 from the other end side toward the one end side to the first branch rail 43 or the second branch rail 44. More particularly, the switching claw 45 can switch between a first posture of guiding the stapler 50 on the common rail 42 to the first branch rail 43 and a second posture of guiding the crimping binder 60 on the common rail 42 to the second branch rail 44.

The H1 position sensor 46 detects that the stapler 50 exists at the H1 position, and outputs a detection signal to a controller 100 (see FIG. 5) to be described later. The H2 position sensor 47 detects that the crimping binder 60 exists at the H2 position, and outputs a detection signal to the controller 100. The MS position sensor 48 detects that the stapler 50 or the crimping binder 60 exists at the MS position, and outputs a detection signal to the controller 100. The sheet sensor 49 detects the sheet S or the sheet bundle Sb inserted into the binding case 31 through the binding slit 31*a*, and outputs a detection signal to the controller 100. Each sensor (46 to 49) is, for example, an optical sensor, a magnetic sensor, a mechanical sensor, or the like.

Figure 4A:
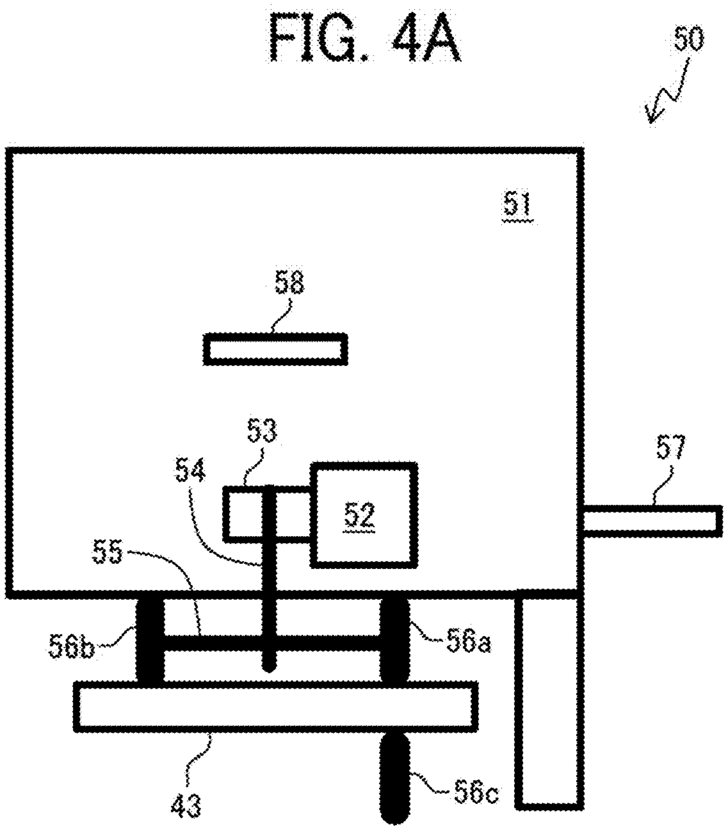
FIGS. 4A and 4B are views illustrating a stapler (A) and a crimping binder (B)
Figure 4B:
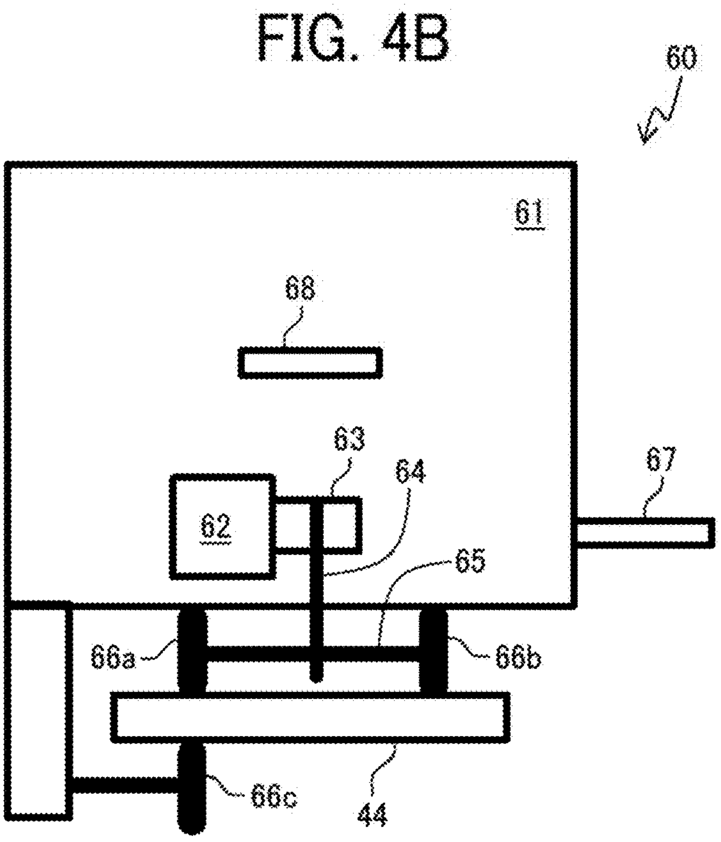

FIGS. 4A and 4B are views illustrating the stapler 50 (A) and the crimping binder 60 (B). The stapler 50 executes "stapling" of inserting a binding needle into the sheet bundle Sb and binding the sheet bundle Sb. The crimping binder 60 executes "crimp binding" of pressure-deforming the sheet bundle Sb and binding the sheet bundle Sb. The stapler 50 and the crimping binder 60 bind the sheet bundle Sb by different methods. One of the stapler 50 and the crimping binder 60 is an example of a first binder, and the other is an example of a second binder. However, the combination of different binding methods is not limited to the stapling and the crimp binding. As another example, different types of binding needles (shape, size, color) may be used.

As illustrated in FIG. 4A, the stapler 50 includes a stapling main body 51, a drive motor 52, a gear 53, a belt 54, a rotation shaft 55, rollers 56*a*, 56*b*, and 56*c*, and fillers 57 and 58. The stapling main body 51 executes stapling. That is, the stapling main body 51 inserts the binding needle loaded in the cartridge into the sheet bundle Sb. The stapling main body 51 supports other components (52 to 58) of the stapler 50.

The drive motor 52 generates a driving force for moving the stapler 50. The driving force of the drive motor 52 is transmitted to the rollers 56*a* and 56*b* through the gear 53, the belt 54, and the rotation shaft 55, and is transmitted to the roller 56*c* through a transmission mechanism. The rollers 56*a* to 56*c* sandwich the common rail 42 and the first branch rail 43, and are rotated by the driving force transmitted from the drive motor 52. As a result, the stapler 50 is guided by the common rail 42 and the first branch rail 43 and moves between the H1 position and the MS position.

The filler 57 is a portion to be detected by the H1 position sensor 46 when the stapler 50 is located at the H1 position. The filler 58 is a portion to be detected by the MS position sensor 48 when the stapler 50 is located at the MS position. For example, in a case where the H1 position sensor 46 and the MS position sensor 48 are optical sensors, the fillers 57 and 58 are portions that reflect or block light output from the sensors.

As illustrated in FIG. 4B, the crimping binder 60 includes a crimp binding main body 61, a drive motor 62, a gear 63, a belt 64, a rotation shaft 65, rollers 66*a*, 66*b*, and 66*c*, and fillers 67 and 68. The crimp binding main body 61 executes a crimp binding. That is, the crimp binding main body 61 sandwiches the sheet bundle Sb with a pair of binding teeth to pressure-deform the sheet bundle Sb. In addition, the crimp binding main body 61 supports other components (62 to 68) of the crimping binder 60.

The drive motor 62 generates a driving force for moving the crimping binder 60. The driving force of the drive motor 62 is transmitted to the rollers 66*a* and 66*b* through the gear 63, the belt 64, and the rotation shaft 65, and is transmitted to the roller 66*c* through a transmission mechanism. The rollers 66*a* to 66*c* sandwich the common rail 42 and the second branch rail 44, and are rotated by the driving force transmitted from the drive motor 62. As a result, the crimping binder 60 is guided by the common rail 42 and the second branch rail 44 and moves between the H2 position and the MS position.

The filler 67 is a portion to be detected by the H2 position sensor 47 when the crimping binder 60 is located at the H2 position. The filler 68 is a portion to be detected by the MS position sensor 48 when the crimping binder 60 is located at the MS position. For example, in a case where the H2 position sensor 47 and the MS position sensor 48 are optical sensors, the fillers 67 and 68 are portions that reflect or block light output from the sensors.

Figure 5:
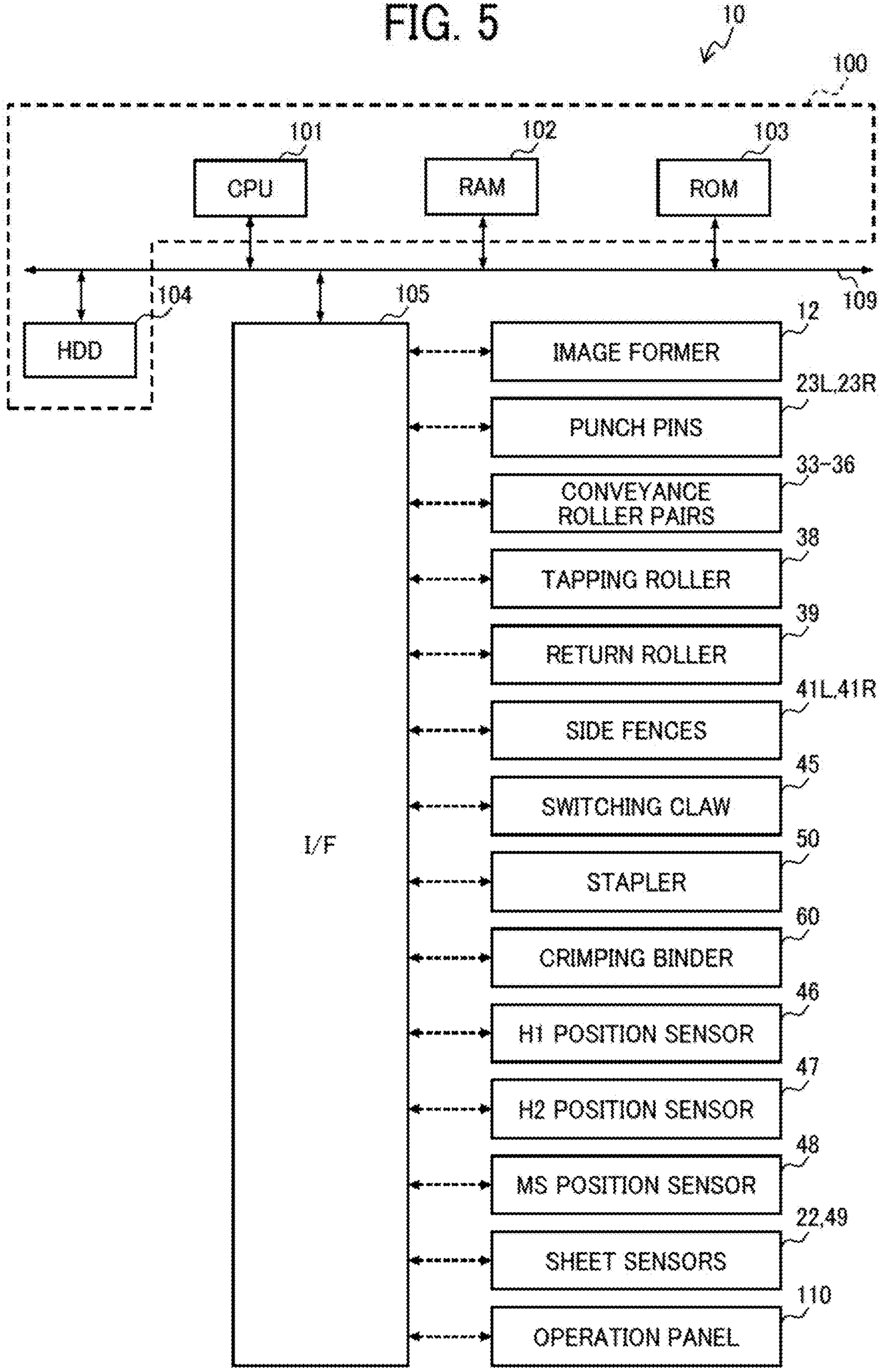
FIG. 5 is a hardware configuration diagram of the image forming apparatus.

FIG. 5 is a block diagram illustrating a hardware configuration of the image forming apparatus 10. As illustrated in FIG. 5, the image forming apparatus 10 includes a central processing unit (CPU) 101, a random access memory (RAM) 102, and a read only memory (ROM) 103, a hard disk drive (HDD) 104, and an interface (I/F) 105. The CPU 101, the RAM 102, the ROM 103, the HDD 104, and the I/F 105 are coupled to each other via a common bus 109.

The CPU 101 is an arithmetic unit and controls the overall operation of the image forming apparatus 10. The RAM 102 is a volatile storage medium that allows data to be read and written at high speed. The CPU 101 uses the RAM 102 as a work area for data processing. The ROM 103 is a read-only non-volatile storage medium that stores programs such as firmware. The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the image forming apparatus 10 processes, for example, a control program stored in the ROM 103 and an information processing program (application program) loaded into the RAM 102 from a storage medium such as the HDD 104. Such process configures a software controller including various functional modules of the image forming apparatus 10. The software controller thus configured cooperates with hardware resources of the image forming apparatus 10 construct functional blocks to implement functions of the image forming apparatus 10. That is, the CPU 101, the RAM 102, the ROM 103, and the HDD 104 constitute a controller 100 that controls the operation of the image forming apparatus 10.

The I/F 105 is an interface that couples the image former 12, the punch pins 23L and 23R, the conveyance roller pairs 33 to 36, the tapping roller 38, the return roller 39, the side fences 41L and 41R, the switching claw 45, the stapler 50, the crimping binder 60, the H1 position sensor 46, the H2 position sensor 47, the MS position sensor 48, the sheet sensors 22 and 49, and the operation panel 110 to the common bus 109. The controller 100 acquires various types of information from the H1 position sensor 46, the H2 position sensor 47, the MS position sensor 48, the sheet sensors 22 and 49, and the operation panel 110 via the I/F 105, and operates the image former 12, the punch pins 23L and 23R, the conveyance roller pairs 33 to 36, the tapping roller 38, the return roller 39, the side fences 41L and 41R, the switching claw 45, the stapler 50, and the crimping binder 60.

Note that the controller 100 illustrated in FIG. 5 collectively controls the image former 12, the puncher 20, and the binding unit 30. As another example, the image former 12, the puncher 20, and the binding unit 30 may be operated in conjunction with each other by mutual communication among a controller that controls the operation of the image former 12, a controller that controls the operation of the puncher 20, and a controller that controls the operation of the binding unit 30.

The operation panel 110 includes an operation unit that receives an input operation by an operator and a display (notification unit) that notifies the operator of information. The operation unit includes, for example, hard keys and a touch panel superimposed on a display. The operation panel 110 acquires information from the operator through the operation device and provides the operator with information through the display. A specific example of the notification unit is not limited to the display and may be a light emitting diode (LED) lamp or a speaker.

The controller 100 drives the drive motor 52 in a state where the switching claw 45 is switched to the first posture to move the stapler 50 to the H1 position, the OS position, and the MS position. In addition, the controller 100 drives the drive motor 62 in a state where the switching claw 45 is switched to the second posture to move the crimping binder 60 to the H1 position, the OS position, and the MS position. Furthermore, when the controller 100 controls one of the stapler 50 and the crimping binder 60 to move, the controller 100 controls the other of the stapler 50 and the crimping binder 60 to stand by at the standby position (H1 position/H2 position).

A description is given of an automatic binding process according to an embodiment of the present embodiment.

Figure 6:
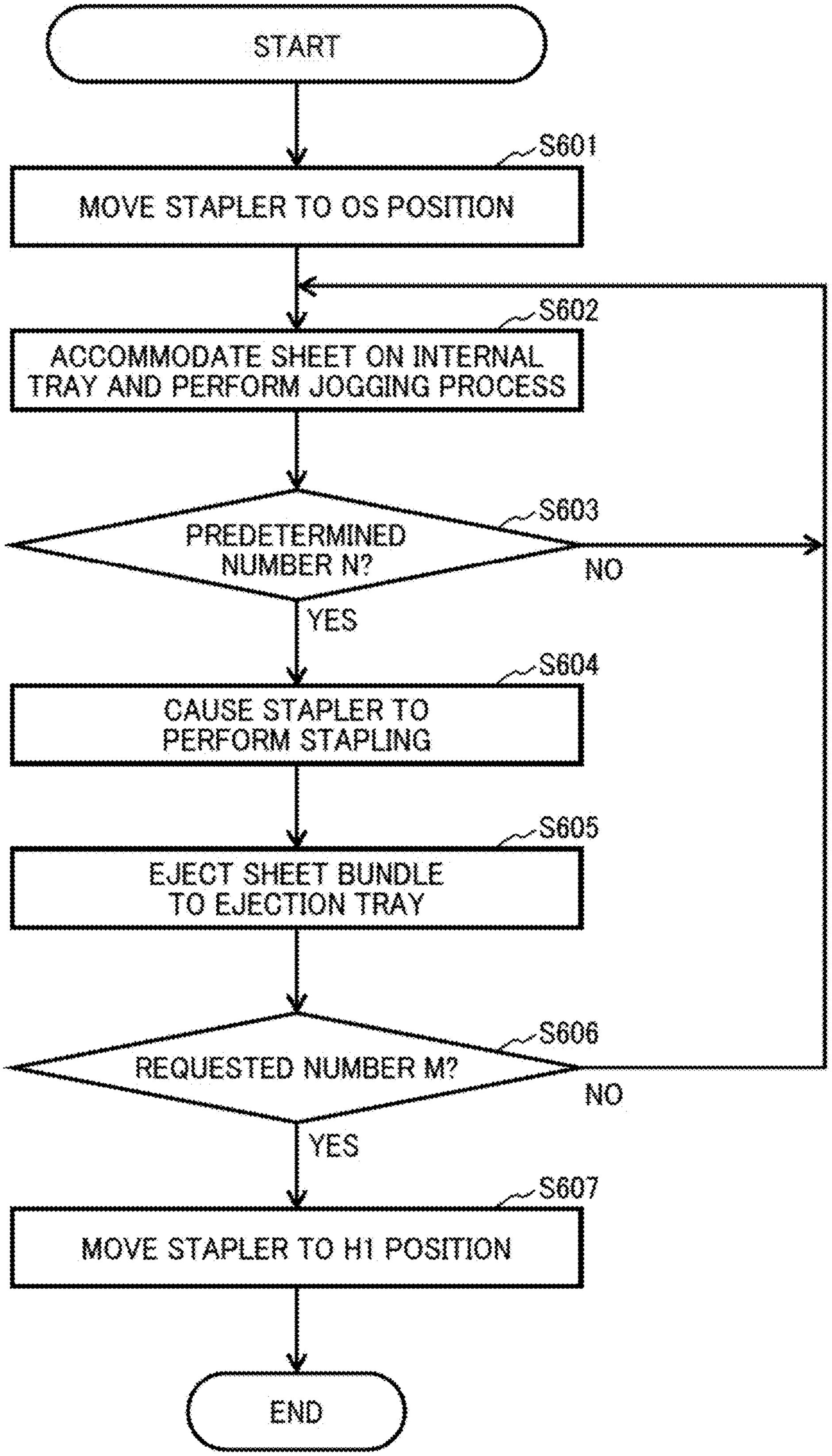
FIG. 6 is a flowchart of an automatic binding process.
Figure 7:
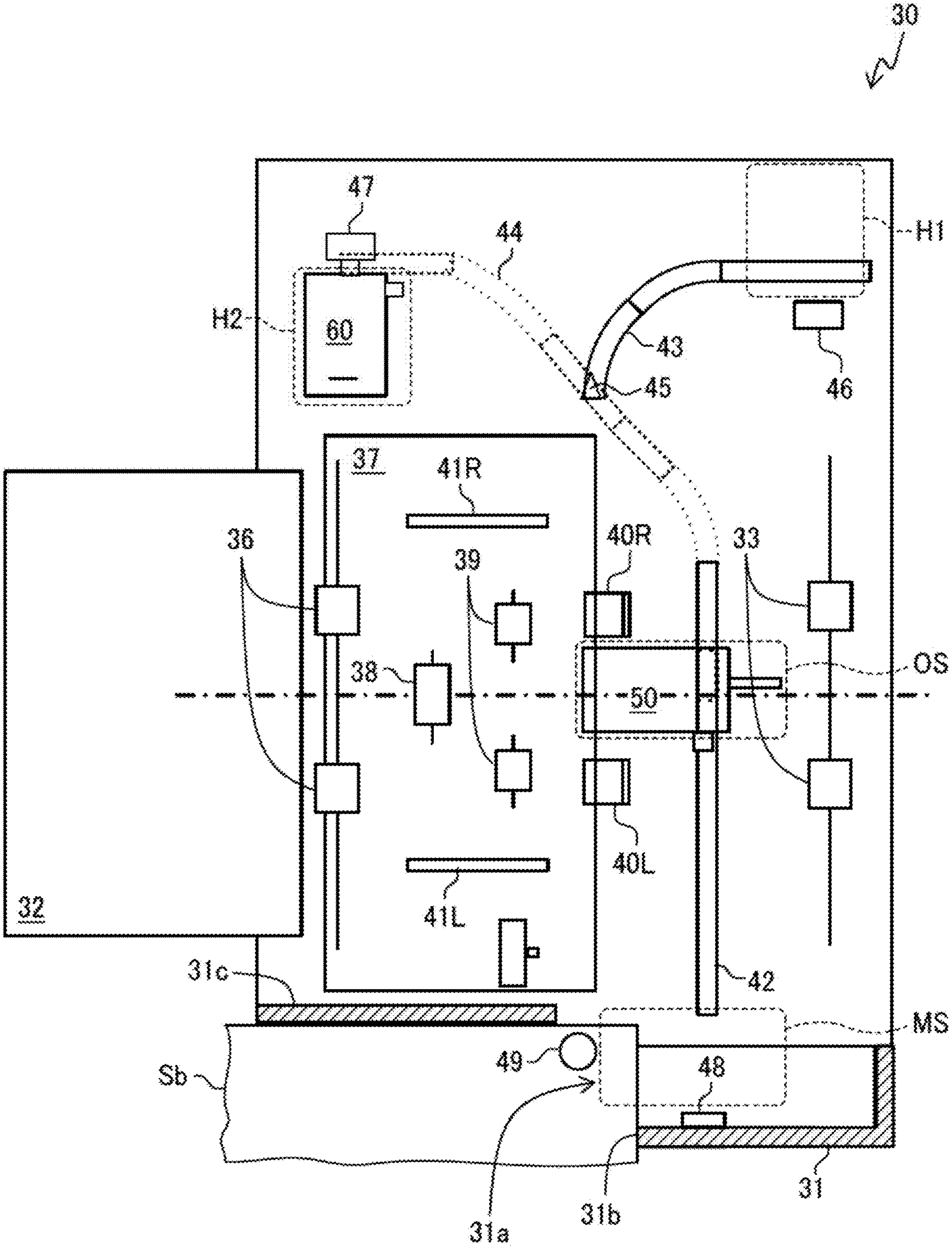
FIG. 7 is a diagram illustrating positions of a stapler and a crimping binder during execution of an automatic binding process.
Figure 8A:
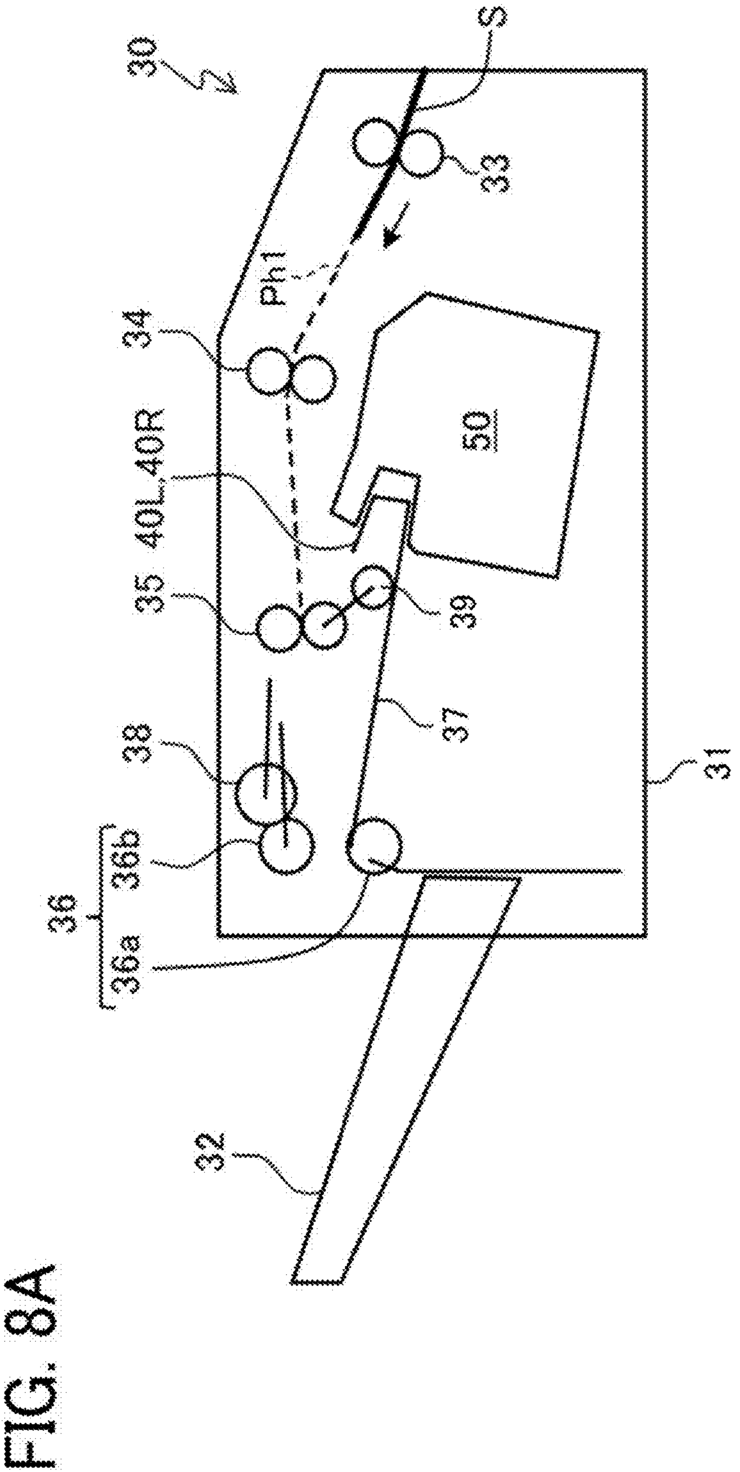
FIGS. 8A and 8B are diagrams illustrating a state of a binding unit until a sheet reaches a conveyance roller pair.
Figure 8B:
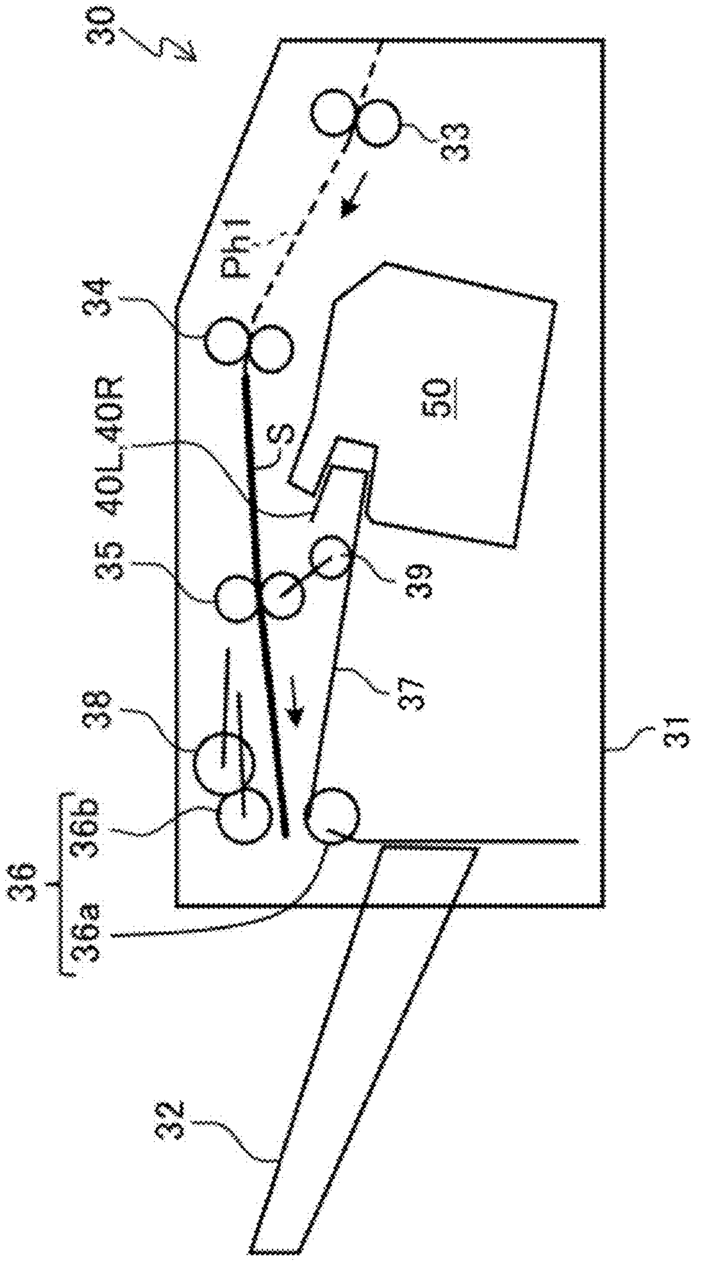
Figure 9A:
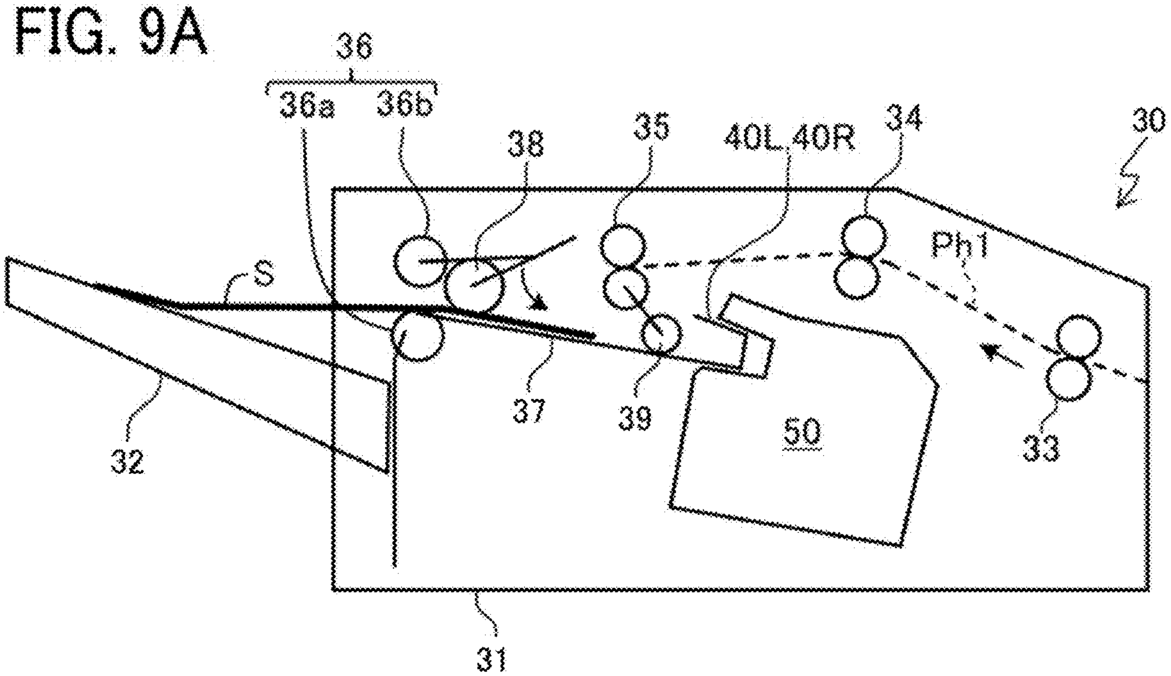
FIGS. 9A and 9B are views illustrating a state of a binding unit that performs stapling.
Figure 9B:
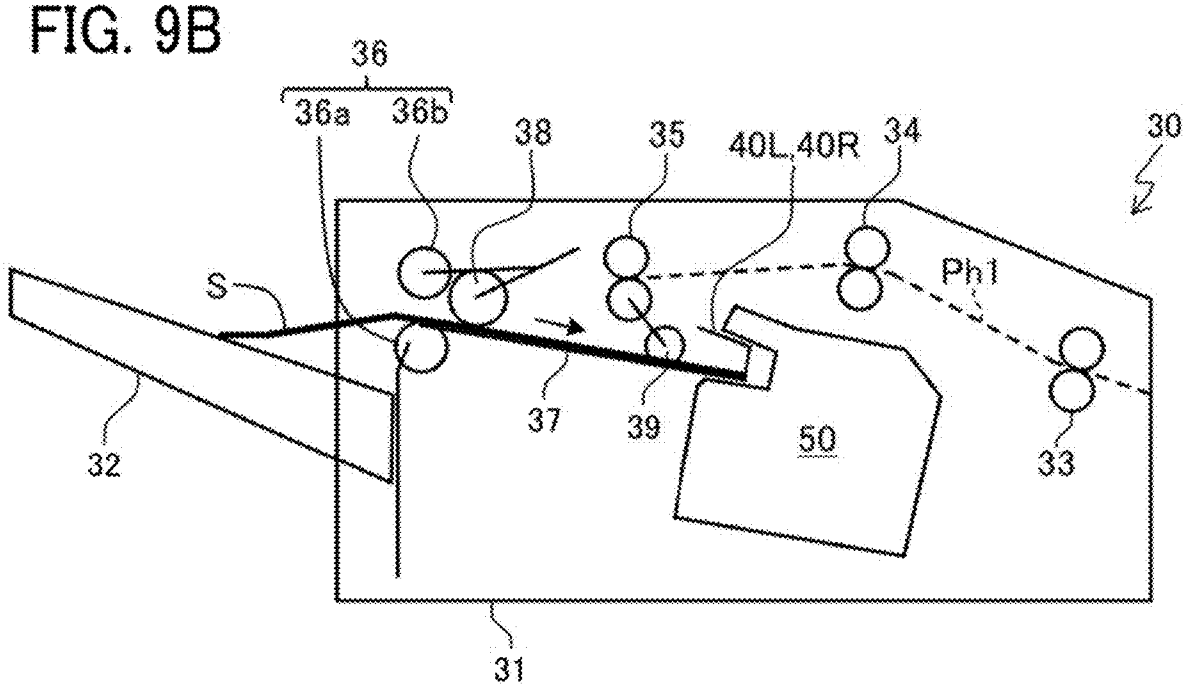
Figure 10A:
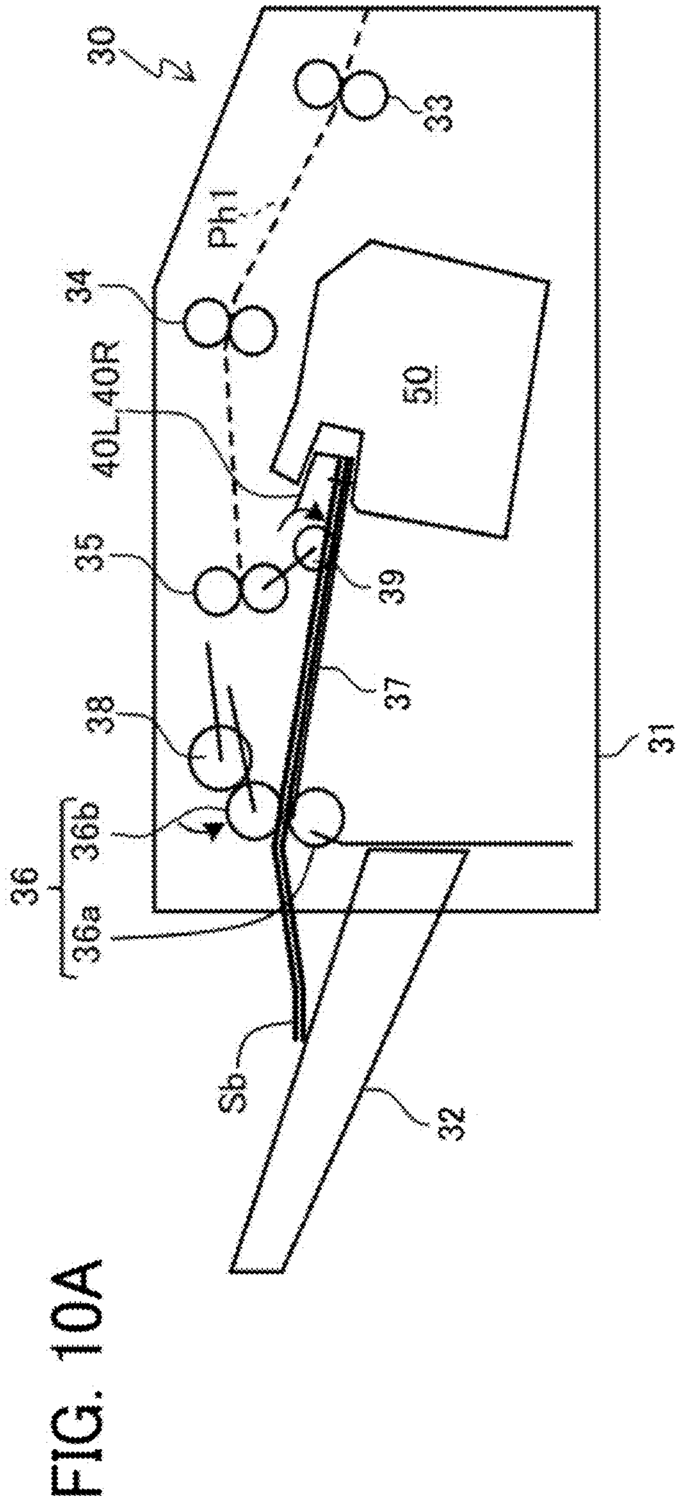
FIGS. 10A and 10B are diagrams illustrating a state of a binding unit in a case where a sheet bundle subjected to a binding process is ejected to an ejection tray.
Figure 10B:
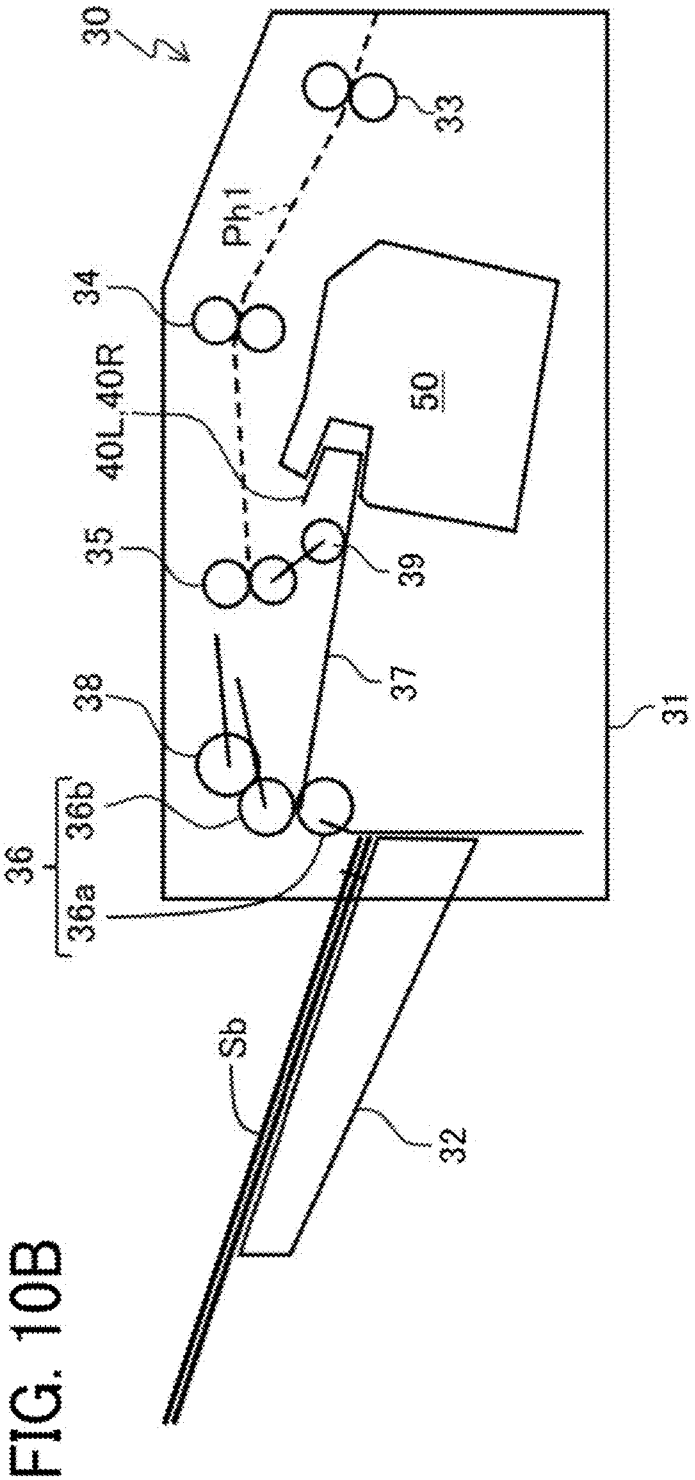

FIG. 6 is a flowchart of the automatic binding process. FIG. 7 is a view illustrating positions of the stapler 50 and the crimping binder 60 during execution of the automatic binding process. FIGS. 8A and 8B are diagrams illustrating a state of the binding unit 30 until the sheet S reaches the conveyance roller pair 36. FIGS. 9A and 9B are views illustrating a state of the binding unit 30 that performs stapling. FIGS. 10A and 10B are diagrams illustrating a state of the binding unit 30 in a case where the sheet bundle Sb subjected to the binding process is ejected to the ejection tray 32.

For example, the controller 100 starts the automatic binding process illustrated in FIG. 6 at a timing when the controller 100 acquires an instruction to execute the automatic binding process from the operation panel 110 or an external device. In the following description, the instruction to execute the automatic binding process is referred to as an "automatic binding command". The automatic binding process is a process of binding N sheets S sequentially stacked on the internal tray 37 by the conveyance roller pairs 33 to 36 and the tapping roller 38. More particularly, the automatic binding process is a process of binding N sheets S on which images are formed by the image former 12 into a bundle (that is, the sheet bundle Sb).

The automatic binding command includes, for example, the number of sheets S of the sheet bundle Sb (hereinafter, referred to as a "predetermined number N"), the number of sheet bundles Sb to be subjected to the automatic binding process (hereinafter, referred to as a "requested number M"), a method of binding the sheet bundle Sb (stapling/crimp binding), and the OS position. In the following description, the number of sheets S of the sheet bundle Sb is referred to as "given number N", and the number of sheet bundles Sb to be subjected to the automatic binding process may be referred to as "requested number M of copies". Hereinafter, a series of processes (S602 to S605 in FIG. 6) until binding one sheet bundle Sb is referred to as a "task", and a series of processes (S601 to S607 in FIG. 6) in which the task is repeated M times is referred to as a "job".

In the present embodiment, it is assumed that stapling is designated as a method of binding the sheet bundle Sb.

In this case, the stapler 50 is the first binder, and the crimping binder 60 is the second binder. On the other hand, when "crimp binding" is designated as the method of binding the sheet bundle Sb, the crimping binder 60 is the first binder, and the stapler 50 is the second binder. In addition, at the start of the automatic binding process, as illustrated in FIG. 3, it is assumed that the stapler 50 is located at the H1 position and the crimping binder 60 is located at the H2 position.

First, as illustrated in FIG. 7, the controller 100 moves the stapler 50 from the H1 position to the OS position instructed by the automatic binding command (S601). Next, as illustrated in FIGS. 8A and 8B and FIGS. 9A and 9B, the controller 100 rotates the conveyance roller pairs 33 to 36 and the tapping roller 38 to stack the sheet S on which an image is formed by the image former 12 on the internal tray 37 (S602). The controller 100 moves the side fences 41L and 41R to align the position in the main scanning direction of the sheet S or the sheet bundle Sb placed on the internal tray 37 (so-called jogging).

Next, the controller 100 determines whether the number of sheets S stacked on the internal tray 37 has reached the predetermined number N instructed by the automatic binding command (S603). Then, when determining that the number of sheets S stacked on the internal tray 37 has not reached the predetermined number N (S603: No), the controller 100 executes the process of step S602 again. That is, the controller 100 repeatedly executes the process of step S602 until the number of sheets S stacked on the internal tray 37 reaches a predetermined number N.

Then, when the controller 100 determines that the number of sheets S stacked on the internal tray 37 has reached the predetermined number N (S603: Yes), the controller 100 causes the stapler 50 to perform stapling at the OS position (S604). Next, as illustrated in FIGS. 10A and 10B, the controller 100 rotates the conveyance roller pair 36 and the return roller 39 to eject the stapled sheet bundle Sb to the ejection tray 32 (S605).

Next, the controller 100 determines whether the number of ejected sheet bundles Sb has reached the requested number M of copies indicated by the automatic binding command (S606). In a case where the controller 100 determines that the number of copies has not reached the requested number M of copies (S606: No), the process of and after step S602 is executed again. That is, the controller 100 repeatedly executes the tasks of steps S602 to S605 until the number of sheet bundles Sb ejected to the ejection tray 32 reaches the requested number M of copies (S606: No). Then, when the controller 100 determines that the number of sheet bundles Sb ejected to the ejection tray 32 has reached the requested number M of copies (S606: Yes), the controller 100 moves the stapler 50 to the H1 position as illustrated in FIG. 3 (S607).

Figure 11A:
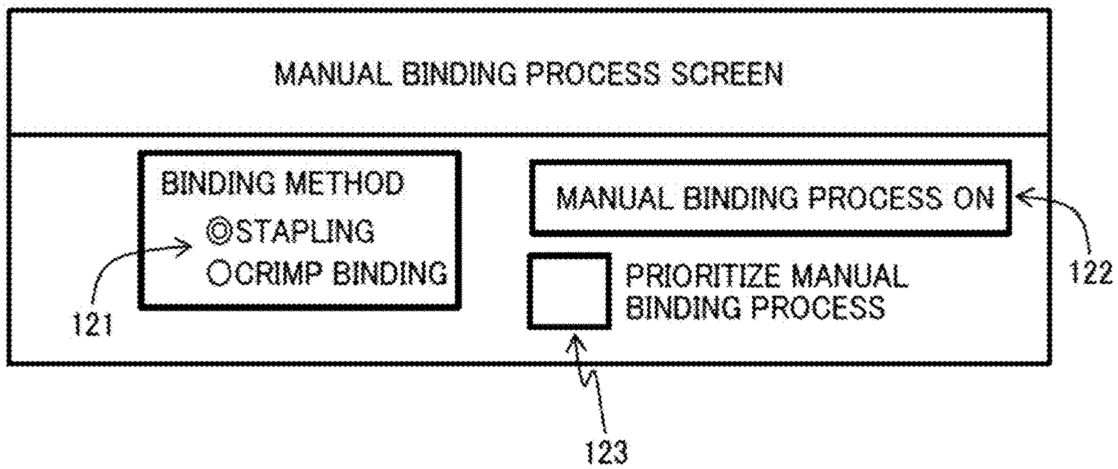
FIGS. 11A, 11B, and 11C are a display example of a manual binding process screen.
Figure 11B:
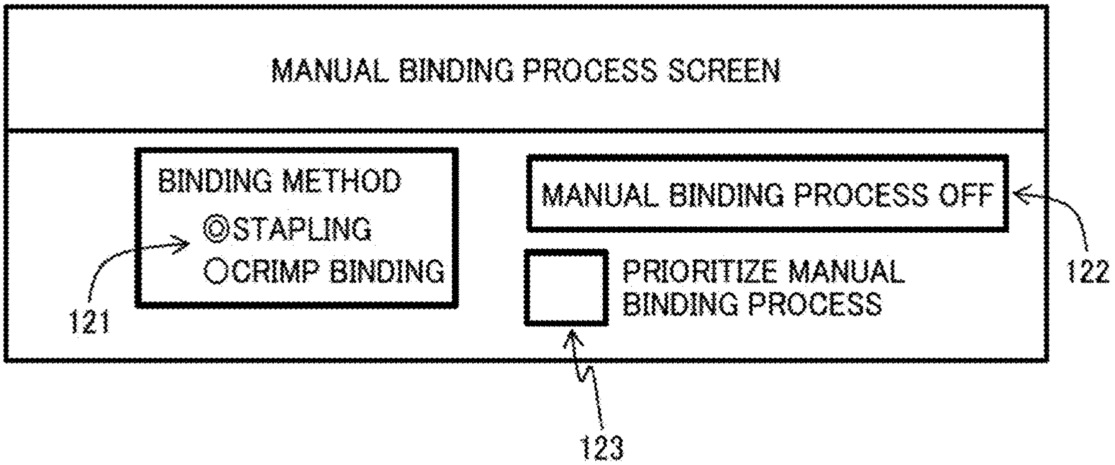
Figure 11C:
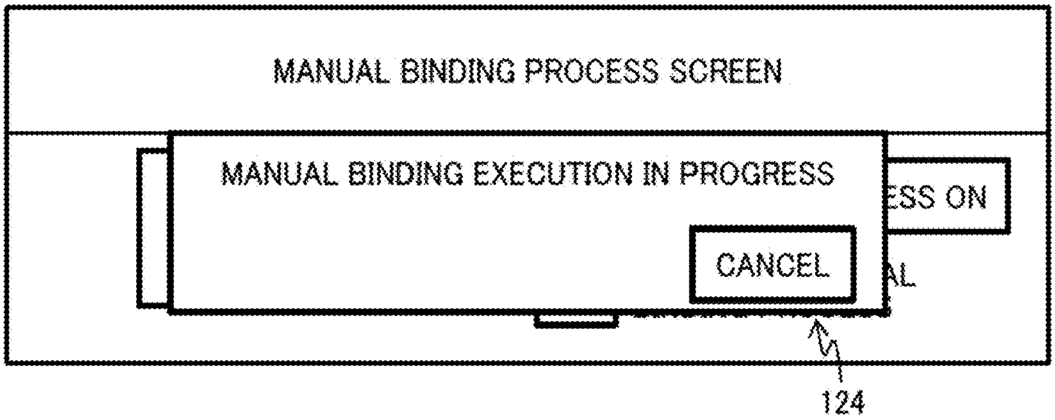

FIGS. 11A, 11B and 11C are a display example of a manual binding process screen. The controller 100 displays the manual binding process screen illustrated in FIGS. 11A, 11B and 11C on the operation panel 110. The manual binding process screen includes, for example, a radio button 121 for selecting a binding method (stapling/crimp binding), a selection button 122 for selecting whether to permit (ON) or prohibit (OFF) the execution of the manual binding process, and a check box 123 for selecting whether to prioritize the manual binding process over the automatic binding process. As illustrated in FIGS. 11A and 11B, the selection button 122 is switched between ON and OFF every time it is tapped.

Then, the operator selects the binding method using the radio button 121, selects whether or not the manual binding process is permitted using the selection button 122, and selects whether or not the manual binding process is prioritized using the check box 123. In addition, in a case where the manual binding process is permitted using the selection button 122, the controller 100 executes the manual binding process at the timing when the detection signal is output from the sheet sensor 49. The manual binding process is a process of binding the sheet bundle Sb inserted into the binding case 31 through the binding slit 31*a*.

A description is given of a manual binding process 1 according to an embodiment of the present embodiment.

Figure 12:
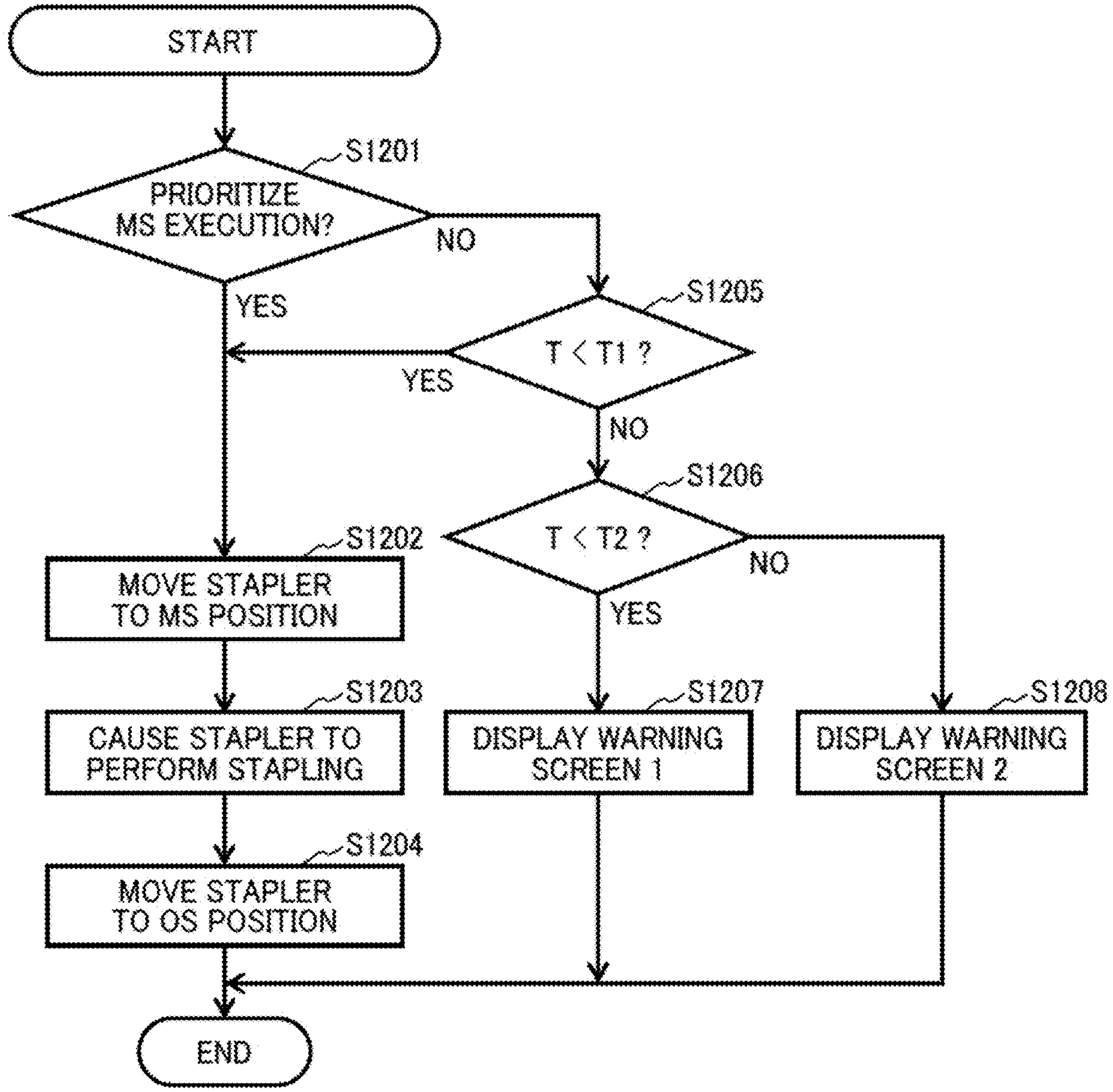
FIG. 12 is a flowchart of a manual binding process.
Figure 13:
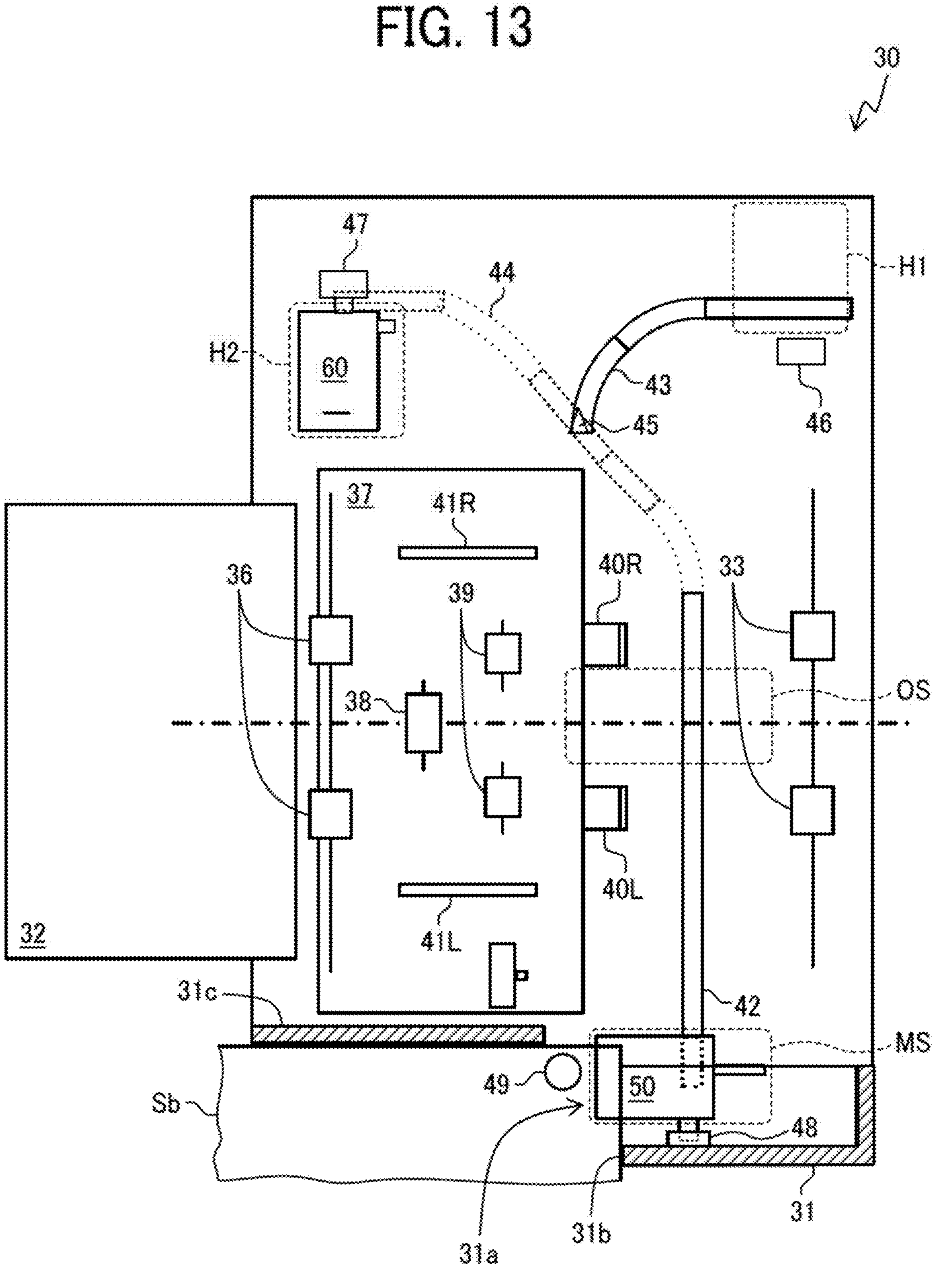
FIG. 13 is a diagram illustrating positions of a stapler and a crimping binder during execution of a manual binding process.
Figure 14A:
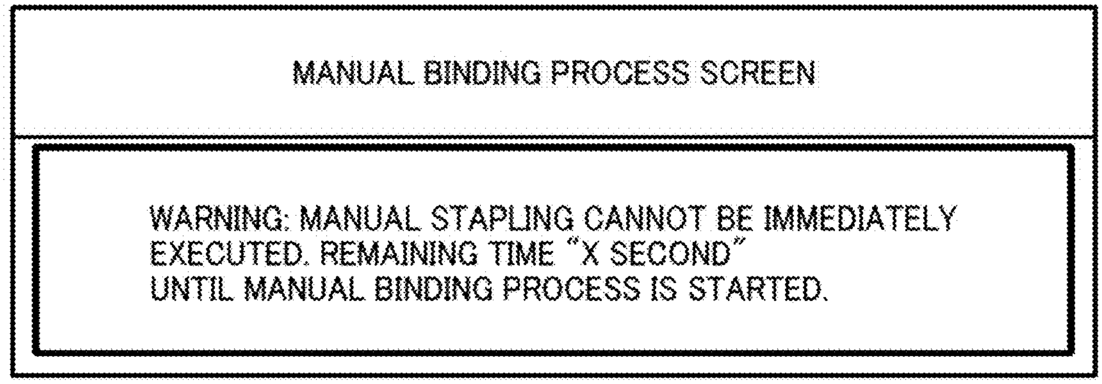
FIGS. 14A, 14B, and 14C are a display example of an operation panel during execution of a manual binding process.
Figure 14B:
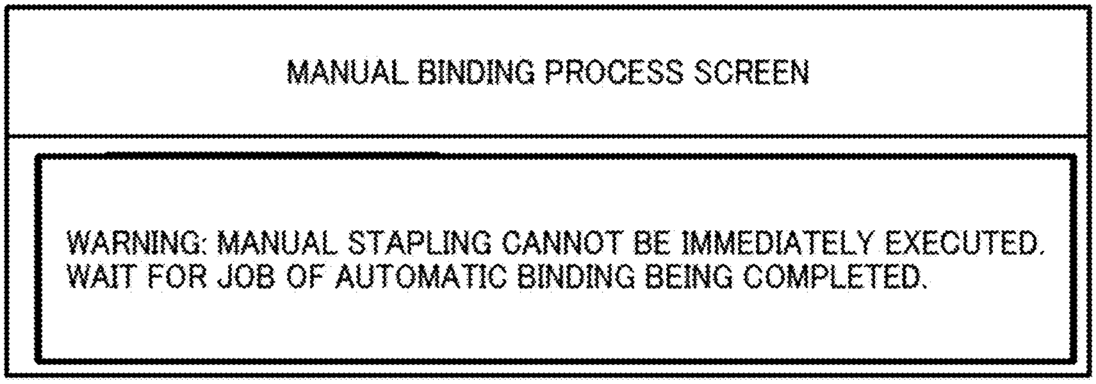
Figure 14C:
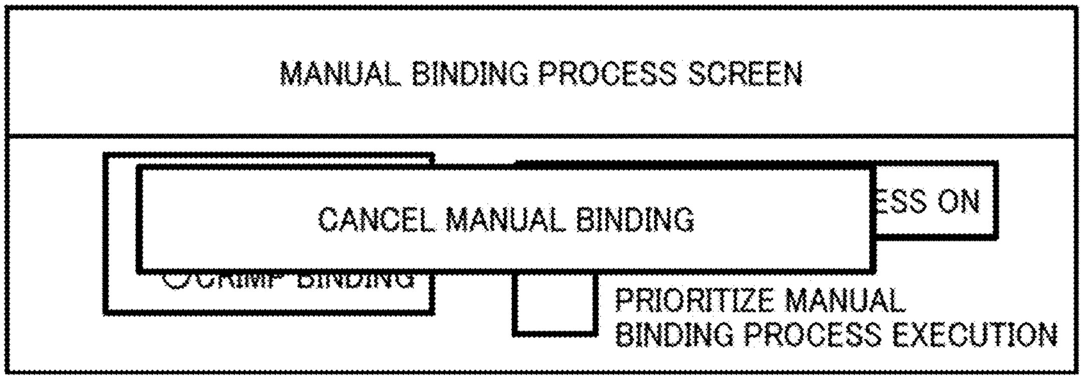

FIG. 12 is a flowchart of the manual binding process 1. FIG. 13 is a view illustrating positions of the stapler 50 and the crimping binder 60 during the execution of the manual binding process. FIGS. 14A, 14B, and 14C are a display example of the operation panel 110 during the execution of the manual binding process.

In a case where "stapling" is selected by the radio button 121, when the sheet bundle Sb is inserted into the binding case 31 through the binding slit 31*a* during the execution of the automatic binding process by the stapler 50, the controller 100 executes the manual binding process 1 illustrated in FIG. 12. Inserting the sheet bundle Sb into the binding slit 31*a* is an example of an instruction to execute the manual binding process.

However, a button for instructing execution of the manual binding process may be displayed on the operation panel 110. Among multiple the tasks of the automatic binding process, the task at the start of the manual binding process is referred to as a "current task", and the task next to the current task is referred to as a "next task".

Since the automatic binding process is being executed at the start of the manual binding process 1, it is assumed that the stapler 50 is at the OS position and the crimping binder 60 is at the H2 position as illustrated in FIG. 7. Further, in the manual binding process 1, the stapler 50 may be replaced with the crimping binder 60. That is, the manual binding process 1 is a process in a case where the automatic binding process and the manual binding process are executed by the same binder.

First, the controller 100 determines whether the check box 123 is checked on the manual binding process screen (S1201). The check of the check box 123 is an example of an input operation instructing to prioritize the execution of the manual binding process over the execution of the automatic binding process.

Next, in a case where the controller 100 determines that the check box 123 is checked (S1201: Yes), the controller 100 executes the manual binding process (S1202 to S1204) without executing the process of step S1205 to be described later. That is, in a case where the controller 100 receives an input operation instructing to prioritize the execution of the manual binding process through the operation panel 110 (S1201: Yes), regardless of the magnitude relationship between the requested time T and the current task time T1 (waiting time TO) (S1205), steps S1202 to S1204 are executed.

Then, as illustrated in FIG. 13, the controller 100 moves the stapler 50 from the OS position to the MS position (S1202). Next, in response to the arrival of the stapler 50 at the MS position, the controller 100 causes the stapler 50 at the MS position to perform stapling on the sheet bundle Sb inserted into the binding case 31 through the binding slit 31*a* (S1203). Next, in response to the completion of the stapling, the controller 100 moves the stapler 50 from the MS position to the OS position as illustrated in FIG. 7 (S1204).

The controller 100 causes the operation panel 110 to display the execution-in-progress screen illustrated in FIG. 11C during the execution of the processes of steps S1202 to S1204. The display of the execution-in-progress screen is an example of notifying through the operation panel 110 that the manual binding process is being executed. The execution-in-progress screen includes a cancel button 124. The cancel button 124 is a button for giving an instruction to cancel the manual binding process. The same applies to the execution of the processes of steps S1502 to S1506 in FIG. 15. Process when the cancel button 124 is pressed will be described later with reference to FIG. 17.

Note that the controller 100 executes the processes of steps S602 to S603 of FIG. 6 in parallel with the processes of steps S1202 to S1204. That is, the controller 100 executes the manual binding process in parallel with the stacking of the sheet bundle Sb on the internal tray 37 in the current task. Then, after executing the processes of steps S1202 to S1204, the controller 100 executes the remaining process of the current task. That is, the controller 100 completes the current task after executing the manual binding process. In other words, the controller 100 interrupts the current task of the automatic binding process and executes the manual binding process.

On the other hand, in a case where the controller 100 determines that the check box 123 is not checked (S1201: No), the controller 100 compares the requested time T requested for an execution of the manual binding process (S1202 to S1204) with the current task time T1 until the number of sheets S stacked on the internal tray 37 in the current task reaches the predetermined number N (S1205).

The requested time T in the manual binding process 1 is a time requested for the stapler 50 to move from the OS position to the MS position (S1202), the stapler 50 to staple the sheet bundle Sb inserted into the binding case 31 through the binding slit 31*a* (S1203), and the stapler 50 to move from the MS position to the OS position (S1204). That is, the requested time T varies depending on the OS position instructed by the automatic binding command. Furthermore, the requested time T may include a predetermined margin in addition to the minimum time requested for the processes of steps S1202 to S1204.

The current task time T1 is a time until (N-x) sheets S are stacked on the internal tray 37 in a case where the manual binding process is instructed in a state where x ($1 \leq x < N$) sheets S are stacked on the internal tray 37. That is, the current task time T1 varies depending on the predetermined number N instructed by the automatic binding command and the number x of sheets S already stacked on the internal tray 37 at the start of the manual binding process.

Then, in a case where the requested time T is shorter than the current task time T1 (S1205: Yes), the controller 100 executes the processes of steps S1202 to S1204. Then, after executing the processes of steps S1202 to S1204, the controller 100 completes the current task. In a case where the check box 123 is checked, there is a possibility that the predetermined number N of sheets S are stacked on the internal tray 37 before the processes of steps S1202 to S1204 is completed. That is, there is a possibility that a waiting time occurs in the current task. On the other hand, when the requested time T is shorter than the current task time T1, the manual binding process can be interrupted in the current task without generating a waiting time in the current task.

On the other hand, in a case where the requested time T is equal to or longer than the current task time T1 (S1205: No), the controller 100 compares the requested time T with the next task time T2 (S1206). The next task time T2 is a time from a state in which no sheet S is stacked on the internal tray 37 to a state in which a predetermined number N of sheets are stacked. That is, the next task time T2 (>T1) varies depending on the predetermined number N instructed by the automatic binding command. The current task time T1 and the next task time T2 are examples of the waiting time TO until the number of sheets S stacked on the internal tray 37 reaches the predetermined number N although the number of sheets S stacked on the internal tray 37 is different at the measurement start time point.

Next, in a case where the requested time T is equal to or longer than the current task time T1 (S1205: No) and shorter than the next task time T2 (S1206: Yes), the controller 100 displays the warning screen 1 illustrated in FIG. 14A on the operation panel 110 (S1207). The warning screen 1 illustrated in FIG. 14A includes that the manual stapling cannot be immediately executed and includes a remaining time "○ second" until the manual stapling is started. The display of the warning screen 1 is an example of notifying through the operation panel 110 the remaining time until the manual binding process is started. The remaining time until the manual binding process is started corresponds to the current task time T1.

Then, the controller 100 continues the display of the warning screen 1 while counting down the remaining time. In addition, the controller 100 ends the display of the warning screen 1 in response to the remaining time being 0 second. Further, when the detection signal is output from the sheet sensor 49 at the timing when the remaining time becomes 0 second, the controller 100 executes the processes of steps S1202 to S1204. That is, the controller 100 executes the manual binding process after completing the current task of the automatic binding process.

On the other hand, when the requested time T is equal to or longer than the next task time T2 (S1206: No), the controller 100 displays the warning screen 2 illustrated in FIG. 14B on the operation panel 110 (S1208). The display of the warning screen 2 is an example of notifying through the operation panel 110 that the manual binding process cannot be executed until all the tasks of the automatic binding process are completed.

Then, the controller 100 continues the display of the warning screen 2 until all the tasks of the automatic binding process are completed. In addition, the controller 100 ends the display of the warning screen 2 in response to the completion of all the tasks of the automatic binding process. Further, when the detection signal is output from the sheet sensor 49 at the timing when all the tasks of the automatic binding process are completed, the controller 100 executes the processes of steps S1202 to S1204. That is, the controller 100 executes the manual binding process after completing all the tasks of the automatic binding process.

A description is given of a manual binding process 2 according to an embodiment of the present embodiment.

Figure 15:
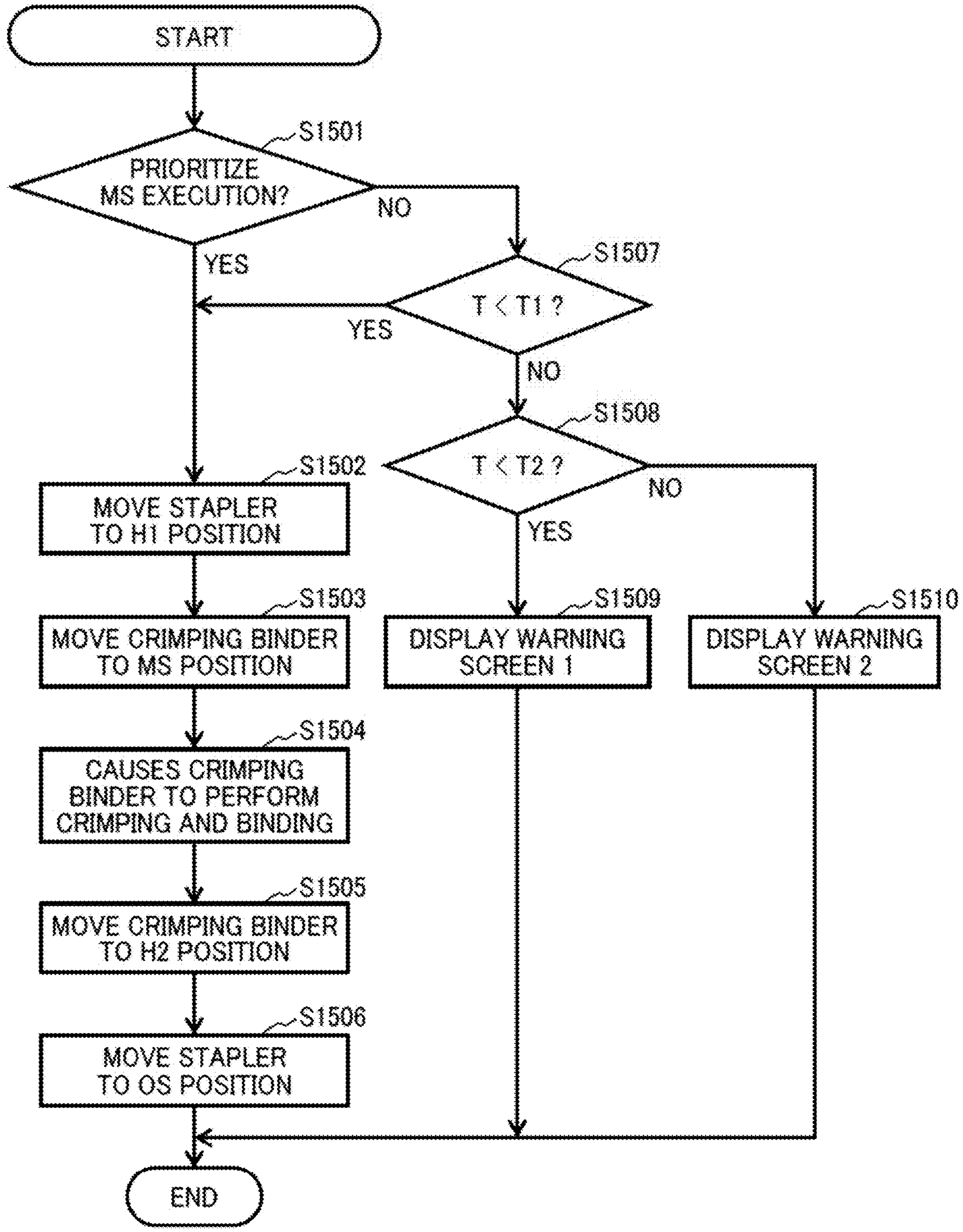
FIG. 15 is a flowchart of a manual binding process.
Figure 16:
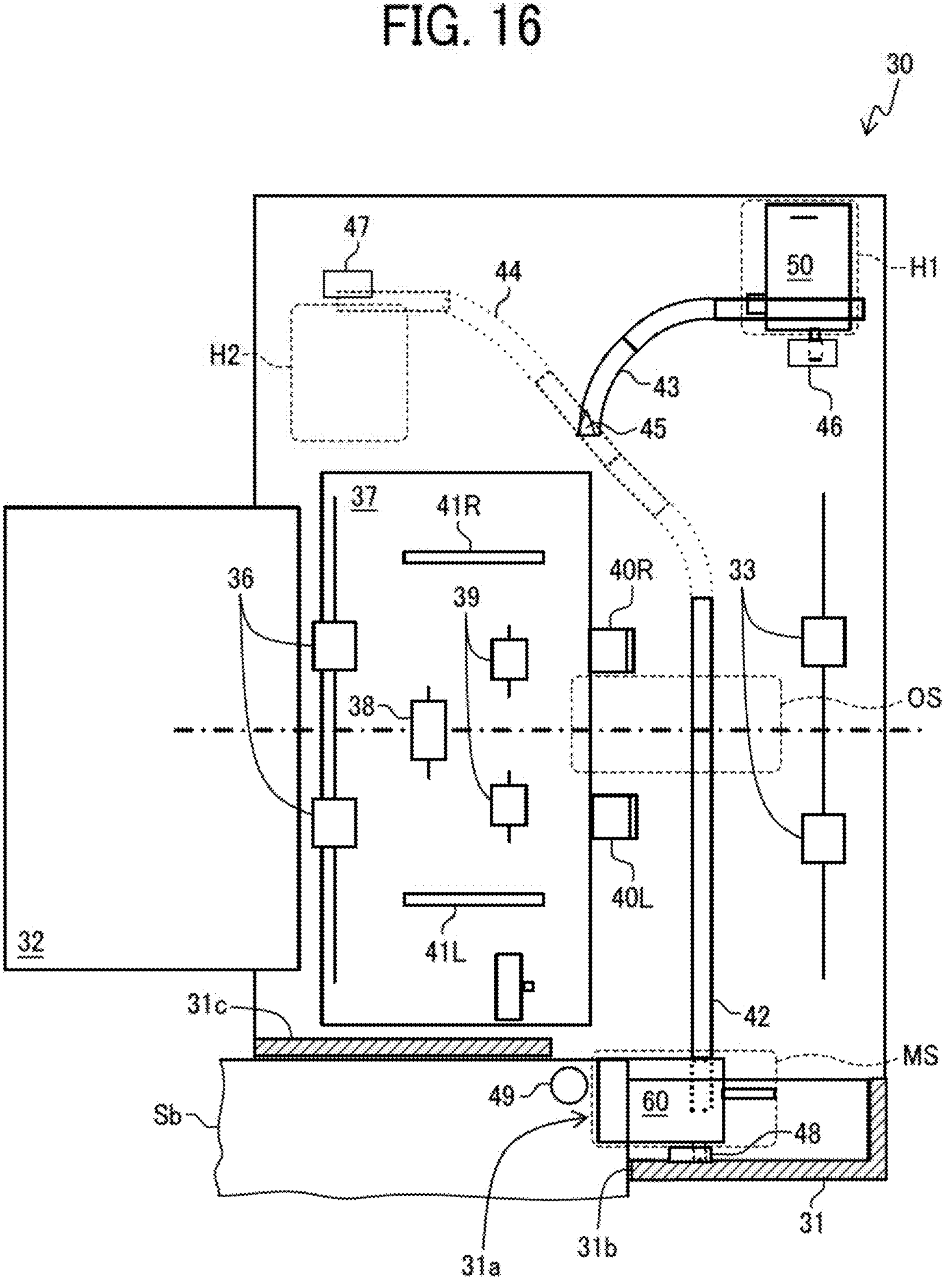
FIG. 16 is a diagram illustrating positions of a stapler and a crimping binder during execution of a manual binding process.

FIG. 15 is a flowchart of the manual binding process 2. FIG. 16 is a view illustrating positions of the stapler 50 and the crimping binder 60 during the execution of the manual binding process. Note that detailed description of points in common with the manual binding process 1 will be omitted, and differences will be mainly described.

In a case where "crimp binding" is selected by the radio button 121, when the sheet bundle Sb is inserted into the binding case 31 through the binding slit 31*a* during the execution of the automatic binding process by the stapler 50, the controller 100 executes the manual binding process 2 illustrated in FIG. 15. Since the automatic binding process is being executed at the start of the manual binding process 2, it is assumed that the stapler 50 is at the OS position and the crimping binder 60 is at the H2 position as illustrated in FIG. 7. In the manual binding process 2, the stapler 50 may be replaced with the crimping binder 60. That is, the manual binding process 2 is a process in a case where the automatic binding process and the manual binding process are executed by different binder.

In a case where the controller 100 determines that the check box 123 is checked (S1501: Yes), the controller 100 executes the manual binding process (S1502 to S1206) without executing the process of step S1507 to be described later. That is, in a case where the controller 100 receives an input operation instructing to prioritize the execution of the manual binding process through the operation panel 110 (S1501: Yes), regardless of the magnitude relationship between the requested time T and the current task time T1 (waiting time TO) (S1507), steps S1502 to S1506 are executed.

Then, as illustrated in FIG. 3, the controller 100 moves the stapler 50 from the OS position to the H1 position (S1502). Next, in response to the arrival of the stapler 50 at the H1 position, the controller 100 moves the crimping binder 60 from the H2 position to the MS position as illustrated in FIG. 16 (S1503). Next, in response to the arrival of the crimping binder 60 at the MS position, the controller 100 causes the crimping binder 60 at the MS position to crimp and bind the sheet bundle Sb inserted into the binding case 31 through the binding slit 31*a* (S1504). Next, in response to the completion of the crimp binding, the controller 100 moves the crimping binder 60 from the MS position to the H2 position as illustrated in FIG. 3 (S1505). Next, in response to the arrival of the crimping binder 60 at the H2 position, the controller 100 moves the stapler 50 from the H1 position to the OS position as illustrated in FIG. 7 (S1506). Note that the controller 100 executes the processes of steps S602 to S603 of FIG. 6 in parallel with the processes of steps S1502 to S1206.

On the other hand, in a case where the controller 100 determines that the check box 123 is not checked (S1501: No), the controller 100 compares the requested time T requested for an execution of the manual binding process (S1502 to S1506) with the current task time T1 until the number of sheets S stacked on the internal tray 37 in the current task reaches the predetermined number N (S1507). The current task time T1 is similar to the manual binding process 1.

The requested time T in the manual binding process 2 is a time requested for the stapler 50 to move from the OS position to the H1 position (S1502), the crimping binder 60 to move from the H2 position to the MS position (S1503), the crimping binder 60 to crimp and bind the sheet bundle Sb inserted into the binding case 31 through the binding slit 31*a* (S1504), the crimping binder 60 to move from the MS position to the H2 position (S1505), and the stapler 50 to move from the H1 position to the OS position (S1506). That is, the requested time T varies depending on the OS position instructed by the automatic binding command. Furthermore, the requested time T may include a predetermined margin in addition to the minimum time requested for the processes of steps S1502 to S1506.

Then, in a case where the requested time T is shorter than the current task time T1 (S1507: Yes), the controller 100 executes the processes of steps S1502 to S1506. Then, after executing the processes of steps S1502 to S1506, the controller 100 completes the current task. When the check box 123 is checked, there is a possibility that the predetermined number N of sheets S are stacked on the internal tray 37 before the processes of steps S1502 to S1506 is completed. That is, there is a possibility that a waiting time occurs in the current task. On the other hand, when the requested time T is shorter than the current task time T1, the manual binding process can be interrupted in the current task without generating a waiting time in the current task.

On the other hand, when the requested time T is equal to or longer than the current task time T1 (S1507: No), the controller 100 compares the requested time T with the next task time T2 (S1508). The next task time T2 is similar to the manual binding process 1. Then, in a case where the requested time T is equal to or longer than the current task time T1 (S1507: No) and shorter than the next task time T2 (S1508: Yes), the controller 100 displays the warning screen 1 on the operation panel 110 (S1509). On the other hand, in a case where the requested time T is equal to or longer than the next task time T2 (S1508: No), the controller 100 displays the warning screen 2 on the operation panel 110 (S1509). Process after the information to be displayed on the warning screens 1 and 2 and after the warning screens 1 and 2 are displayed is common to the manual binding process 1.

A description is given of a manual binding cancellation process according to an embodiment of the present embodiment.

Figure 17:
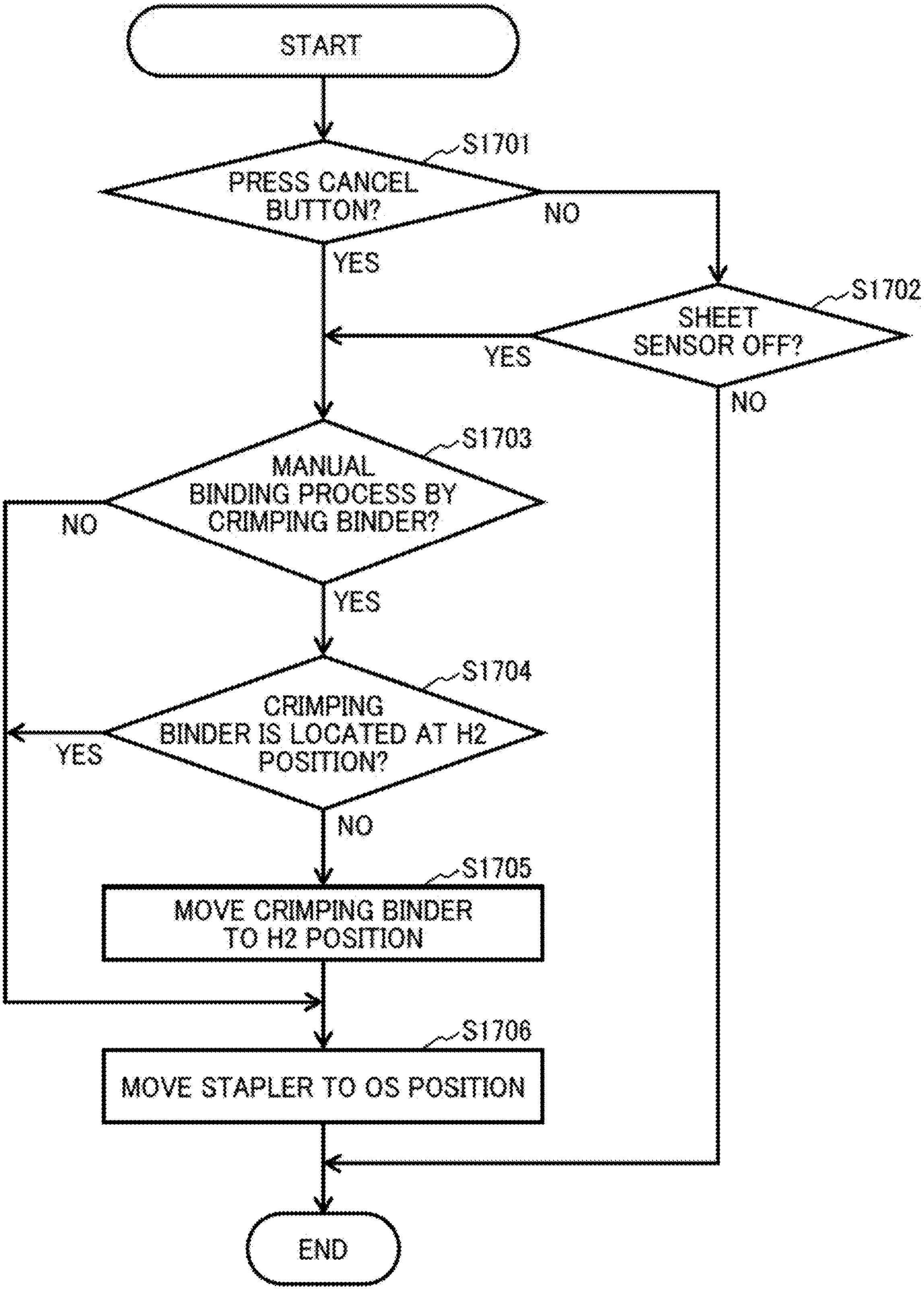
FIG. 17 is a flowchart of a manual binding cancellation process.

FIG. 17 is a flowchart of a manual binding cancellation process. The controller 100 repeatedly executes the manual binding cancellation process illustrated in FIG. 17 at predetermined time intervals while executing the processes of steps S1202 to S1204 of FIG. 12 or steps S1502 to S1506 of FIG. 15. Note that, in FIG. 17, it is assumed that the manual binding process is executed during the automatic binding process by the stapler 50. On the other hand, in a case where the manual binding process is executed during the automatic binding process by the crimping binder 60, the stapler 50 and the crimping binder 60 are replaced in FIG. 17.

In a case where the cancel button 124 in FIG. 11C is not pressed (S1701: No) and the output of the detection signal from the sheet sensor 49 continues (S1702: No), the controller 100 ends the manual binding cancellation process without executing the processes of steps S1703 to S1706 (that is, the manual binding process is not canceled).

In a case where the cancel button 124 is pressed (S1701: Yes) or in a case where the output of the detection signal from the sheet sensor 49 is stopped (S1702: Yes), the controller 100 cancels the manual binding process (S1703 to S1706). Note that the output of the detection signal from the sheet sensor 49 is stopped in a case where the sheet bundle Sb is pulled out from the binding slit 31*a* during the execution of the manual binding process.

More particularly, the controller 100 determines whether or not the manual binding process by the crimping binder 60 is being executed (S1703). Next, in a case where the controller 100 determines that the manual binding process by the crimping binder 60 is being executed (S1703: Yes), the controller 100 determines whether or not the crimping binder 60 is located at the H2 position based on the H2 position sensor 47 (S1704).

Then, in a case where the controller 100 determines that the crimping binder 60 is not located at the H2 position (S1704: No), the controller 100 moves the crimping binder 60 to the H2 position (S1705).

Next, in response to the arrival of the crimping binder 60 at the H2 position, the controller 100 moves the stapler 50 from the H1 position to the OS position (S1706) and displays the notification screen illustrated in FIG. 14C on the operation panel 110. Then, the controller 100 resumes the automatic binding process.

On the other hand, in a case where the controller 100 determines that the manual binding process by the stapler 50 is being executed (S1703: No) or in a case where the controller 100 determines that the crimping binder 60 is located at the H2 position (S1704: Yes), the controller 100 skips the process of step S1705, executes the process of step S1706 (S1706), and displays the notification screen illustrated in FIG. 14C on the operation panel 110. Then, the controller 100 resumes the automatic binding process.

Below, a description is given of an operation and effect according to an embodiment of the present embodiment.

According to the above embodiment, by providing the first branch rail 43 and the second branch rail 44 branched in different directions on the side opposite to the MS position of the common rail 42, the binder not used for the manual binding process can be retracted to the standby position (H1 position/H2 position). As a result, the manual binding process can be executed by any of multiple the binders having different binding methods.

Further, according to the above embodiment, in a case where the requested time T of the manual binding process is shorter than the current task time T1, the manual binding process is interrupted during the current task. Therefore, the manual binding process can be executed without generating a waiting time of the current task (that is, the throughput of the automatic binding process is not reduced).

In addition, according to the above embodiment, in a case where the requested time T of the manual binding process is equal to or longer than the current task time T1 and shorter than the next task time T2, the manual binding process is interrupted during the next task. Therefore, the manual binding process can be executed without generating waiting times of the current task and the next task (that is, the throughput of the automatic binding process is not reduced).

Further, according to the above embodiment, in a case where the requested time T of the manual binding process is equal to or longer than the next task time T2, the manual binding process is executed after all the tasks of the automatic binding process are completed. Therefore, the manual binding process can be executed without causing a waiting time of each task (that is, the throughput of the automatic binding process is not reduced).

Further, according to the above embodiment, by switching between the warning screens 1 and 2 according to the magnitude relationship between the requested time T and one of the current task time T1 and the next task time T2, the operator can be allowed to recognize the timing at which the manual binding process can be executed. As a result, the stress of the operator due to the fact that the manual binding process is not started can be reduced even though the sheet bundle Sb is inserted into the slit 31*a*.

On the other hand, according to the above embodiment, by checking the check box 123 instructing to prioritize the execution of the manual binding process, the manual binding process is interrupted regardless of the magnitude relationship between the requested time T and one of the current task time T1 and the next task time T2, and thus, the stress of the operator who desires to prioritize the manual binding process can be reduced.

Further, according to the above embodiment, the manual binding process is cancelled and the automatic binding process is resumed by the cancel button 124 or the pulling out of the sheet bundle Sb from the slit 31*a*.

As a result, a decrease can be minimized in the throughput of the automatic binding process. Note that the processes of the cancel button 124 and step S1701 may be omitted, or the processes of the sheet sensor 49 and step S1702 may be omitted.

The present disclosure is not limited to specific embodiments described above, and numerous additional modifications and variations are possible in light of the teachings within the technical scope of the appended claims. While the above-described embodiments are preferred examples, those skilled in the art will readily conceive various modifications from those disclosed herein. Such embodiments and variations thereof are included in the scope and gist of the embodiments of the present disclosure and are included in the embodiments described in claims and the equivalent scope thereof.

A description is given below of some aspects of the present disclosure.

According to a first aspect, a medium processing device includes: a conveyor that conveys a medium sheet-shaped in a conveyance direction, the medium having multiple media; a tray on which multiple the media conveyed by the conveyor is stacked; a first binder that binds multiple the media stacked on the tray; a second binder that binds multiple the media stacked on the tray by a method different from the first binder; a common guide that extends in a main scanning direction orthogonal to the conveyance direction on a downstream side of the tray in the conveyance direction; a first branch guide that extends between one end of the common guide and a first standby position; a second branch guide that extends between one end of the common guide and a second standby position; and a case that accommodates the conveyor, the tray, the first binder, the second binder, the common guide, the first branch guide, and the second branch guide, and that has a slit into which multiple the media is allowed to be inserted at a manual binding position at another end of the common guide. The first binder is guided by the common guide and the first branch guide to move between the first standby position and the manual binding position, and the second binder is guided by the common guide and the second branch guide to move between the second standby position and the manual binding position.

According to a second aspect, the medium processing device of the first aspect includes: a first detector that detects that the first binder exists at the first standby position; a second detector that detects that the second binder exists at the second standby position; and a manual binding position detector that detects that the first binder or the second binder exists at the manual binding position.

According to a third aspect, the medium processing device of the first aspect or the second aspect includes: a controller that controls the conveyor, the first binder, and the second binder. The controller executes: an automatic binding process of causing the first binder or the second binder to bind a predetermined number N of the media sequentially stacked on the tray by the conveyor at an automatic binding position on the common guide; and a manual binding process of causing the first binder or the second binder to bind multiple the media inserted through the slit at the manual binding position.

According to a fourth aspect, in the medium processing device of the third aspect, in a case where the manual binding process by the second binder is instructed during an execution of the automatic binding process by the first binder, the controller completes the automatic binding process after executing the manual binding process when a requested time T requested for an execution of the manual binding process is shorter than a waiting time TO until a number of the media stacked on the tray reaches the predetermined number N. The requested time T is a time requested for the first binder to move from the automatic binding position to the first standby position, the second binder to move from the second standby position to the manual binding position, the second binder to bind multiple the media inserted through the slit, the second binder to move from the manual binding position to the second standby position, and the first binder to move from the first standby position to the automatic binding position.

According to a fifth aspect, in the medium processing device of the fourth aspect, the automatic binding process is a process in which a task of binding the predetermined number N of the media is repeated M times, and in a case where the manual binding process is instructed in a state where x ($1 \leq x < N$) sheets of the media are stacked on the tray, the controller completes a current task of the automatic binding process after executing the manual binding process when the requested time T is shorter than a current task time T1 until ($N-x$) sheets of the media are stacked on the tray, and the controller executes the manual binding process after completing a current task of the automatic binding process when the requested time T is equal to or longer than the current task time T1 and shorter than a next task time T2 until N sheets of the media are stacked on the tray.

According to a sixth aspect, the medium processing device of the fifth aspect further includes: a notification unit that notifies information, the controller controls: the notification unit to notify a remaining time until the manual binding process is started when the requested time T is equal to or longer than the current task time T1 and shorter than the next task time T2, and the notification unit to notify that the manual binding process is not executed until all tasks of the automatic binding process are completed when the requested time T is equal to or longer than the next task time T2.

According to a seventh aspect, the medium processing device of any one of the fourth aspect to the sixth aspect further includes: an operation unit that receives an input operation. The controller completes the automatic binding process after executing the manual binding process regardless of a magnitude relationship between the requested time T and the waiting time TO when an input operation instructing to prioritize execution of the manual binding process is received through the operation unit.

According to an eighth aspect, the medium processing device of any one of the fourth aspect to the seventh aspect further includes a medium detector that detects the media inserted through the slit. The controller cancels the manual binding process when the media is no longer detected by the medium detector during an execution of the manual binding process.

According to a ninth aspect, the medium processing device of any one of the fourth aspect to the seventh aspect further includes: an operation unit that receives an input operation. The controller cancels the manual binding process when an input operation instructing to cancel the manual binding process is received through the operation unit during an execution of the manual binding process.

According to a tenth aspect, in the medium processing device of any one of the third aspect to the ninth aspect, in a case where the manual binding process by the first binder is instructed during an execution of the automatic binding process by the first binder, the controller completes the automatic binding process after executing the manual binding process when a requested time T requested for an execution of the manual binding process is shorter than a waiting time TO until a number of media stacked on the tray reaches the predetermined number N. The requested time T is a time requested for the first binder to move from the automatic binding position to the manual binding position, the first binder to bind multiple the media inserted through the slit, and the first binder to return from the manual binding position to the automatic binding position.

According to an eleventh aspect, an image forming apparatus includes an image former that form an image on a medium, the medium having multiple media; and the medium processing device of any one of the first aspect to the tenth aspect, the medium processing device binding multiple the media on which an image is formed by the image former.

According to a twelfth aspect, a medium processing device includes: a conveyor to convey multiple sheets in a conveyance direction; a tray to stack the multiple sheets conveyed to the tray by the conveyor; a first binder to perform a first binding process on the multiple sheets stacked on the tray; a second binder to perform a second binding process different from the first binding process on the multiple sheets stacked on the tray; a common guide extending in a main scanning direction intersecting the conveyance direction and disposed upstream from the tray in the conveyance direction; a first branch guide branched from one end of the common guide in the main scanning direction to a first standby position in a first direction; and a second branch guide branched from the one end of the common guide in the main scanning direction to a second standby position in a second direction different from the first direction. The first binder is movable between the first standby position and the manual binding position along the first branch guide and the common guide. The second binder is movable between the second standby position and the manual binding position along the second branch guide and the common guide.

According to a thirteenth aspect, the medium processing device further includes a case accommodating the conveyor, the first binder, the second binder, the common guide, the first branch guide, and the second branch guide. The case has a slit at another end of the common guide in the conveyance direction to perform a manual biding operation at a manual binding position. The slit is insertable the multiple sheets at the manual binding position to perform the manual biding operation.

According to a fourteenth aspect, the medium processing device includes: a first detector to detect a presence of the first binder at the first standby position; a second detector to detect a presence of the second binder at the second standby position; and a third detector to detect a presence of one of the first binder and the second binder positioned at the manual binding position.

According to a fifteenth aspect, the medium processing device further includes circuitry configured to cause the conveyor to move one of the first binder and the second binder to an automatic binding position on the common guide facing the tray in the conveyance direction; and cause said one of the first binder and the second binder, at the automatic binding position, to perform a corresponding one of the first binding process and the second binding process on the multiple sheets conveyed by the conveyor to the tray, to perform an automatic binding operation; and cause the conveyor to move one of the first binder and the second binder to the manual binding position; and cause the one of the first binder and the second binder, at the manual binding position, to perform a corresponding one of the first binding process and the second binding process on the multiple sheets inserted into the case through the slit, to perform the manual binding operation.

According to a sixteenth aspect, in response to receiving an instruction for the manual binding operation of the second binder during the automatic binding operation of the first binder, the circuitry is further configured to, based on a determination that the first time (T) for the manual binding operation is shorter than a second time (T0): cause the conveyor to move the first binder from the automatic binding position to the first standby position; cause the conveyor to move the second binder from the second standby position to the manual binding position; cause the second binder at the manual binding position to perform the manual binding operation of the second binding process, on the multiple sheets inserted into the case through the slit, to complete the manual binding operation of the second binder before the automatic binding operation of the first binder; cause the conveyor to move the second binder from the manual binding position to the second standby position; cause the conveyor to move the first binder from the first standby position to the automatic binding position; and cause the first binder at the automatic binding position to perform the automatic binding operation of the first binding process on the multiple sheets stacked on the tray. The first time (T) for the manual binding operation includes: the movement of the first binder from the automatic binding position to the first standby position; the movement of the second binder from the second standby position to the manual binding position; the manual binding operation of the second binding process by the second binder; the movement of the second binder from the manual binding position to the second standby position; and the movement of the first binder from the first standby position to the automatic binding position. The second time (T0) is a time for the number of the multiple sheets stacked on the tray to reach N.

According to a seventeenth aspect aspect, the automatic binding operation includes repeating a task of the first binding process on N number of the multiple sheets M times. In response to receiving the instruction for the manual binding operation, with x ($1 \leq x < N$) number of the multiple sheets stacked on the tray, the circuitry is configured to: complete the manual binding operation by the second binder before a current task of the automatic binding operation by the first binder, based on a determination that the first time (T) is shorter than a third time (T1); and complete the current task of the automatic binding operation by the first binder before the manual binding operation by the second binder, based on a determination that the first time (T) is longer than or equal to the third time (T1) and shorter than a fourth time (T2), where the third time (T1) is a time for (N-x) number of the multiple sheets to be stacked on the tray, the fourth time (T2) is a time for N number of the multiple sheets to be stacked on the tray.

According to an eighteenth, the medium processing device further includes a notifier to notify information. The circuitry is configured to: control the notifier to notify a remaining time until a start of the manual binding process, based on a determination that the first time (T) is equal to or longer than the third time (T1) and shorter than the fourth time (T2), and control the notifier to notify that the manual binding operation is not executed until all tasks of the automatic binding operation are completed, based on a determination that the first time (T) is equal to or longer than the fourth time (T2).

According to a nineteenth aspect, the medium processing device further includes an operation unit to receive an input operation. In response to receiving an instruction of a priority of the automatic binding process, the circuitry is configured to complete the manual binding operation by the second binder before the automatic binding operation by the first binder regardless of a magnitude relationship between the first time (T) and the second time (T0).

According to a twentieth aspect, the medium processing device further includes a medium detector to detect the multiple sheets inserted through the slit. The circuitry is further configured to cancel the automatic binding operation by the first binder in response to receiving no detection result from the medium detector during the manual binding operation by the second binder.

According to a twenty-first aspect, the medium processing device further includes an operation unit to receive an input operation. The controller is further configured to cancel the manual binding operation by the second binder in response to receiving an instruction for cancelling the manual binding operation by the second binder during the manual binding operation by the second binder through the operation unit.

According to a twenty-second aspect, in response to receiving an instruction for the manual binding operation of the second binder during the automatic binding operation of the second binder, the circuitry is further configured to, based on a determination that the first time (T) for the manual binding operation is shorter than a second time (T0): cause the conveyor to move the first binder from the automatic binding position to the manual binding position; cause the first binder at the manual binding position to perform the manual binding operation of the first binding process, on the multiple sheets inserted into the case through the slit, to complete the manual binding operation by the first binder before the automatic binding operation by the first binder; cause the conveyor to move the first binder from the manual binding position to the automatic binding position; and cause the first binder at the automatic binding position to perform the automatic binding operation of the first binding process on the multiple sheets stacked on the tray. The first time (T) includes: the movement of the first binder from the automatic binding position to the manual binding position; the manual binding operation of the first binding process by the first binder; the movement of the first binder from the manual binding position to the automatic binding position, and the second time (T0) is a time for the number of the multiple sheets stacked on the tray to reach N.

According to a twenty-third aspect, an image forming apparatus includes the medium processing device described above; and an image former to form an image on a sheet of the multiple sheets.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. A medium processing device comprising:

a conveyor configured to convey multiple sheets in a conveyance direction;

a tray configured to stack the multiple sheets conveyed to the tray by the conveyor;

a first binder configured to perform a first binding process on the multiple sheets stacked on the tray;

a second binder configured to perform a second binding process different from the first binding process on the multiple sheets stacked on the tray;

a common guide extending in a main scanning direction intersecting the conveyance direction and disposed upstream from the tray in the conveyance direction;

a first branch guide branched from one end of the common guide in the main scanning direction to a first standby position in a first direction;

a second branch guide branched from the one end of the common guide in the main scanning direction to a second standby position in a second direction different from the first direction;

circuitry configured to:

cause one of the first binder and the second binder to move to an automatic binding position on the common guide facing the tray in the conveyance direction, or a manual binding position along the first branch guide and the common guide, wherein the first binder is movable between the first standby position and the manual binding position, the second binder is movable between the second standby position and the manual binding position, wherein the circuitry is further configured to:

cause the one of the first binder and the second binder, at the automatic binding position, to perform an automatic binding operation of a corresponding one of the first binding process and the second binding process on the multiple sheets conveyed by the conveyor to the tray;

cause the one of the first binder and the second binder, at the manual binding position, to perform a manual binding operation of a corresponding one of the first binding process and the second binding process on the multiple sheets inserted into the case through the slit;

in response to receiving an instruction for the manual binding operation by the second binder during the automatic binding operation by the first binder, and determining that a first time (T) for the manual binding operation is shorter than a second time (T0) for a number of the multiple sheets stacked on the tray to reach N, cause the first binder to move from the automatic binding position to the first standby position;

cause the second binder to move from the second standby position to the manual binding position;

cause the second binder at the manual binding position to perform the manual binding operation of the second binding process, on the multiple sheets inserted into the case through the slit, to complete the manual binding operation by the second binder before the automatic binding operation by the first binder;

cause the second binder to move from the manual binding position to the second standby position;

cause the first binder to move from the first standby position to the automatic binding position; and cause the first binder at the automatic binding position to perform the automatic binding operation of the first binding process on the multiple sheets stacked on the tray, and wherein the first time (T) for the manual binding operation includes time for:

a movement of the first binder from the automatic binding position to the first standby position;

a movement of the second binder from the second standby position to the manual binding position;

the manual binding operation of the second binding process by the second binder;

a movement of the second binder from the manual binding position to the second standby position; and a movement of the first binder from the first standby position to the automatic binding position.

2. The medium processing device according to claim 1, further comprising a case accommodating the conveyor, the first binder, the second binder, the common guide, the first branch guide, and the second branch guide, wherein the case has a slit at another end of the common guide in the conveyance direction to perform the manual biding operation at the manual binding position, and the slit is insertable the multiple sheets at the manual binding position to perform the manual biding operation.

3. The medium processing device according to claim 1, further comprising:

a first detector configured to detect a presence of the first binder at the first standby position;

a second detector configured to detect a presence of the second binder at the second standby position; and a third detector configured to detect a presence of one of the first binder and the second binder positioned at the manual binding position.

4. The medium processing device according to claim 1, wherein the automatic binding operation includes repeating a task of the first binding process on N number of the multiple sheets M times, and in response to receiving the instruction for the manual binding operation, with x (1≤x<N) number of the multiple sheets stacked on the tray, the circuitry is configured to:

complete the manual binding operation by the second binder before a current task of the automatic binding operation by the first binder, based on a determination that the first time (T) is shorter than a third time (T1); and complete the current task of the automatic binding operation by the first binder before the manual binding operation by the second binder, based on a determination that the first time (T) is longer than or equal to the third time (T1) and shorter than a fourth time (T2), where the third time (T1) is a time for (N−x) number of the multiple sheets to be stacked on the tray, the fourth time (T2) is a time for N number of the multiple sheets to be stacked on the tray.

5. The medium processing device according to claim 4, further comprising a notifier configured to notify information, wherein the circuitry is configured to:

control the notifier to notify a remaining time until a start of the manual binding operation, based on a determination that the first time (T) is equal to or longer than the third time (T1) and shorter than the fourth time (T2), and control the notifier to notify that the manual binding operation is not executed until all tasks of the automatic binding operation are completed, based on a determination that the first time (T) is equal to or longer than the fourth time (T2).

6. The medium processing device according to claim 1, further comprising an operation unit configured to receive an input operation, wherein in response to receiving an instruction of a priority of the automatic binding operation, the circuitry is configured to complete the manual binding operation by the second binder before the automatic binding operation by the first binder regardless of a magnitude relationship between the first time (T) and the second time (T0).

7. The medium processing device according to claim 1, further comprising a medium detector configured to detect the multiple sheets inserted through the slit, wherein the circuitry is further configured to cancel the automatic binding operation by the first binder in response to receiving no detection result from the medium detector during the manual binding operation by the second binder.

8. The medium processing device according to claim 1, further comprising an operation unit configured to receive an input operation, wherein the circuitry is further configured to cancel the manual binding operation by the second binder in response to receiving an instruction for cancelling the manual binding operation by the second binder during the manual binding operation by the second binder through the operation unit.

9. An image forming apparatus comprising:

the medium processing device according to claim 1; and an image former configured to form an image on a sheet of the multiple sheets.

10. A medium processing device comprising:

a conveyor configured to convey multiple sheets in a conveyance direction;

a tray configured to stack the multiple sheets conveyed to the tray by the conveyor;

a first binder configured to perform a first binding process on the multiple sheets stacked on the tray;

a second binder configured to perform a second binding process different from the first binding process on the multiple sheets stacked on the tray;

a common guide extending in a main scanning direction intersecting the conveyance direction and disposed upstream from the tray in the conveyance direction;

a first branch guide branched from one end of the common guide in the main scanning direction to a first standby position in a first direction;

a second branch guide branched from the one end of the common guide in the main scanning direction to a second standby position in a second direction different from the first direction; and circuitry configured to:

cause one of the first binder and the second binder to move to an automatic binding position on the common guide facing the tray in the conveyance direction, or a manual binding position along the first branch guide and the common guide, wherein the first binder is movable between the first standby position and the manual binding position, the second binder is movable between the second standby position and the manual binding position, wherein the circuitry is further configured to:

cause the one of the first binder and the second binder, at the automatic binding position, to perform an automatic binding operation of a corresponding one of the first binding process and the second binding process on the multiple sheets conveyed by the conveyor to the tray;

cause the one of the first binder and the second binder, at the manual binding position, to perform a manual binding operation of a corresponding one of the first binding process and the second binding process on the multiple sheets inserted into the case through the slit;

in response to receiving an instruction for the manual binding operation by the first binder during the automatic binding operation by the first binder, and determining that a first time (T) for the manual binding operation is shorter than a second time (T0) for a number of the multiple sheets stacked on the tray to reach N, cause the first binder to move from the automatic binding position to the manual binding position;

cause the first binder at the manual binding position to perform the manual binding operation of the first binding process, on the multiple sheets inserted into the case through the slit, to complete the manual binding operation by the first binder before the automatic binding operation by the first binder;

cause the first binder to move from the manual binding position to the automatic binding position; and cause the first binder at the automatic binding position to perform the automatic binding operation of the first binding process on the multiple sheets stacked on the tray, and wherein the first time (T) includes time for:

a movement of the first binder from the automatic binding position to the manual binding position;

the manual binding operation of the first binding process by the first binder;

a movement of the first binder from the manual binding position to the automatic binding position.

11. An image forming apparatus comprising:

the medium processing device according to claim 10; and an image former configured to form an image on a sheet of the multiple sheets.

* * * * *